(12) United States Patent
Maeda

(10) Patent No.: US 7,573,172 B2
(45) Date of Patent: Aug. 11, 2009

(54) MAGNETIC DRIVE APPARATUS

(75) Inventor: Toshinari Maeda, Saitama (JP)

(73) Assignee: Citizen Holdings Co., Ltd., Tokyo (JP)

( * ) Notice: Subject to any disclaimer, the term of this patent is extended or adjusted under 35 U.S.C. 154(b) by 366 days.

(21) Appl. No.: 11/655,262

(22) Filed: Jan. 19, 2007

(65) Prior Publication Data

US 2007/0194647 A1 Aug. 23, 2007

(30) Foreign Application Priority Data

Jan. 23, 2006 (JP) .............................. 2006-013503
Jan. 15, 2007 (JP) .............................. 2007-006437

(51) Int. Cl.
*H02K 37/00* (2006.01)
*H02K 57/00* (2006.01)
*H02N 2/10* (2006.01)

(52) U.S. Cl. ..................... 310/191; 310/26; 310/49 R

(58) Field of Classification Search ............. 310/26, 310/49 R, 190–193, 323.03, 328
See application file for complete search history.

(56) References Cited

U.S. PATENT DOCUMENTS

| 3,370,189 | A | * | 2/1968 | Haydon et al. | ............ | 310/49 R |
| 3,517,227 | A | * | 6/1970 | Dobkin | ........................ | 310/10 |
| 3,826,941 | A | * | 7/1974 | Folmar | ........................ | 310/217 |
| 6,342,746 | B1 | * | 1/2002 | Flynn | ........................ | 310/181 |
| 7,476,998 | B2 | * | 1/2009 | Maeda | ........................ | 310/181 |
| 2006/0181175 | A1 | * | 8/2006 | Pedersen | .................... | 310/268 |
| 2007/0164617 | A1 | * | 7/2007 | Taghezout et al. | ........ | 310/49 R |
| 2009/0072675 | A1 | * | 3/2009 | Kanehara | .................. | 310/49 R |

FOREIGN PATENT DOCUMENTS

| JP | 54-126917 A | | 10/1979 |
| JP | 10-66364 | * | 3/1998 |
| JP | 10-223457 | * | 8/1998 |
| JP | 2002-090473 A | | 3/2002 |
| WO | 2005/096477 | * | 10/2005 |

* cited by examiner

*Primary Examiner*—Burton Mullins
(74) *Attorney, Agent, or Firm*—Westerman, Hattori, Daniels & Adrian, LLP.

(57) ABSTRACT

A magnetic drive apparatus, which has a rotor; and a stator having a stator magnetic flux generator, and a stator magnetic guidepath for guiding magnetic flux from the stator magnetic flux generator to the rotor, and which rotationally drives the rotor relative to the stator by controlling the flow of the magnetic flux of the stator magnetic flux generator, the magnetic drive apparatus being constituted such that it further has magnetic flux controlling means, which is respectively stacked onto and bridges the rotor side end tip of the stator magnetic guidepath and a magnetic pole tip which is arranged at a prescribed angular location on the periphery of the rotor with a first gap with this end tip part, and magnetic flux controlling means has a function for magnetically reconnecting to the magnetic pole tip after controlling the flow of magnetic flux, which is blocked by the first gap. Consequently, there is no need for an excitation coil, power consumption is lowered by reducing the consumption of energy due to the copper loss of the excitation coil and so forth, and the driving apparatus can be made smaller, thinner and less expensively regardless of coil diameter.

9 Claims, 32 Drawing Sheets

STEP0

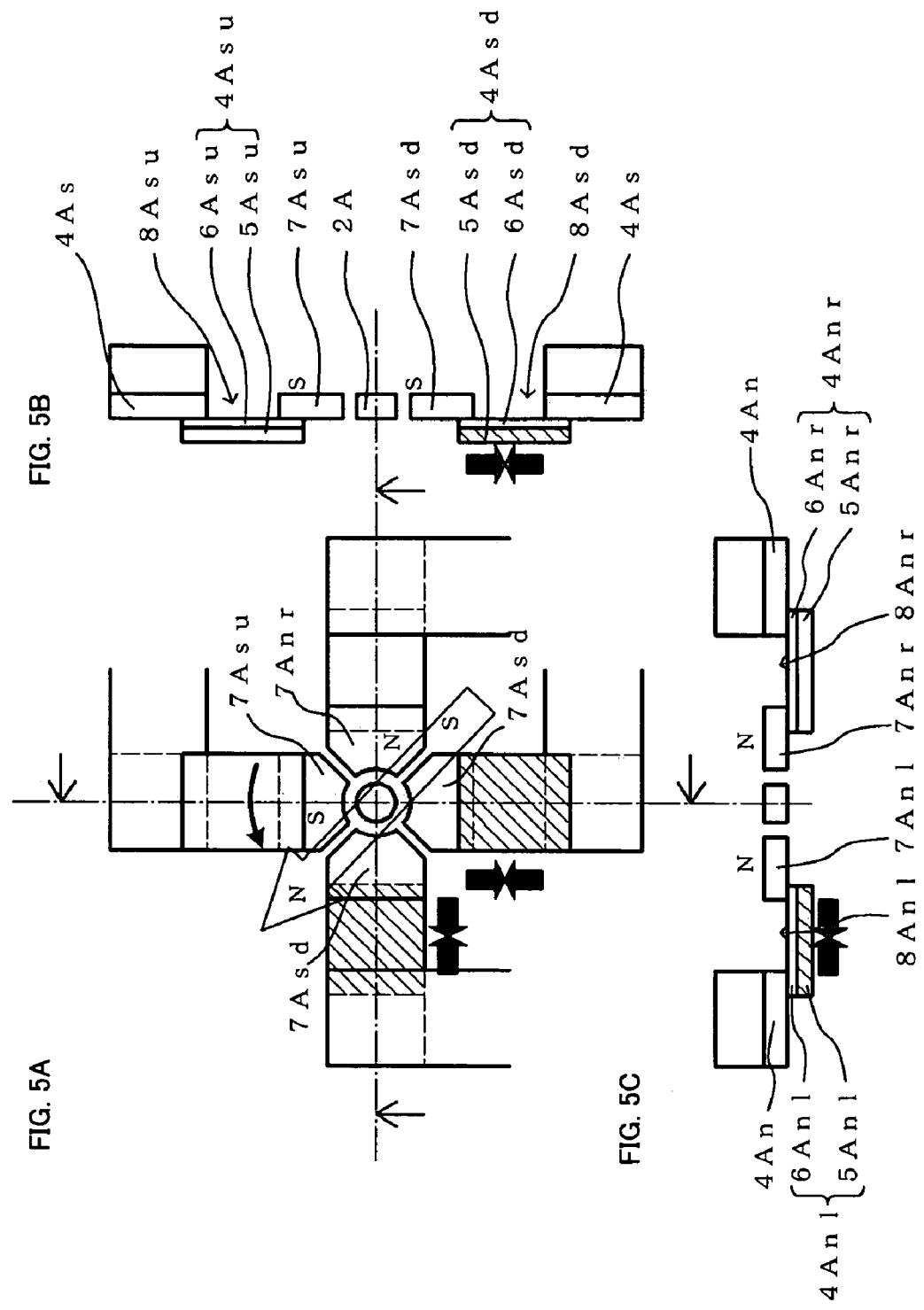

STEP2

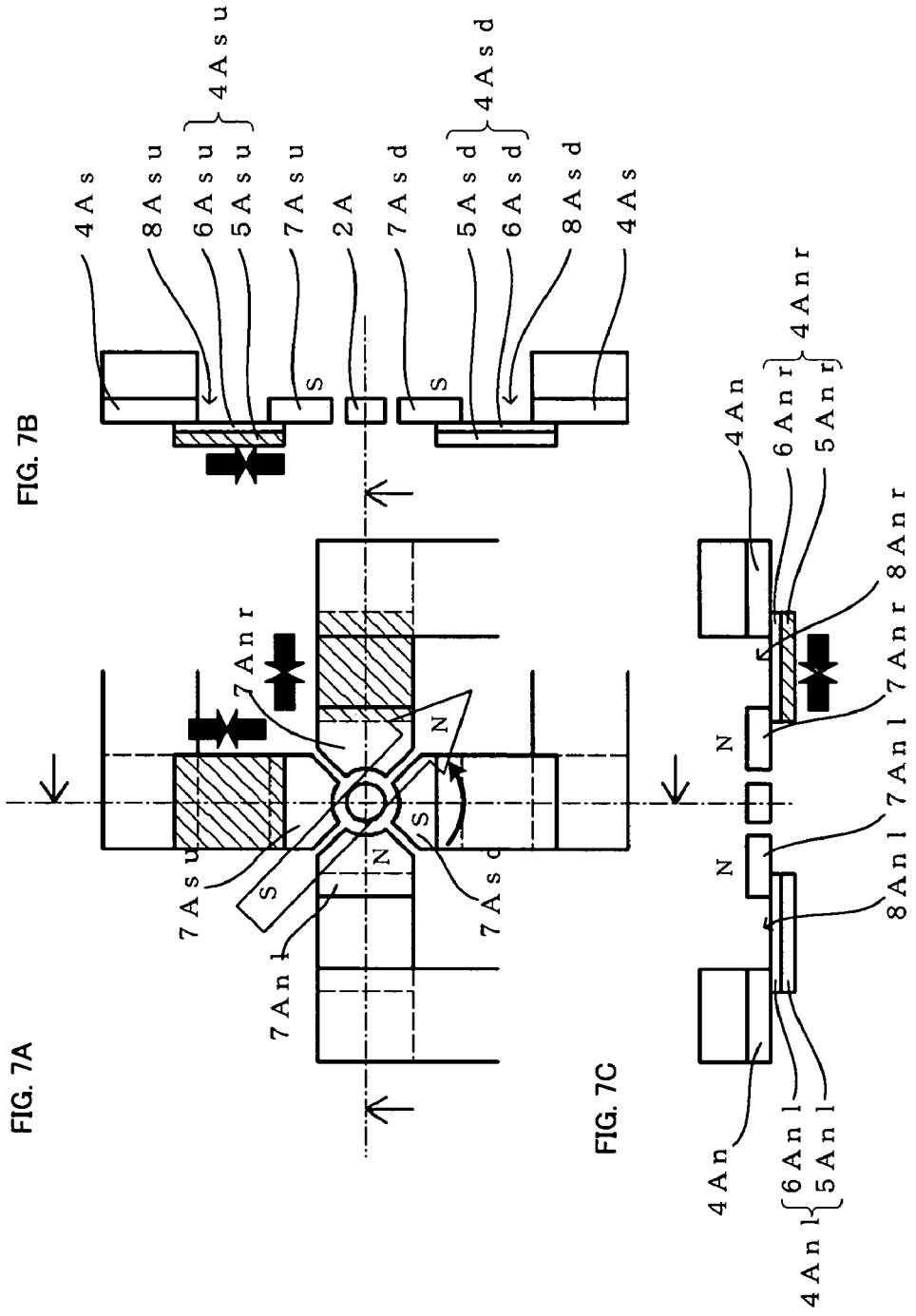

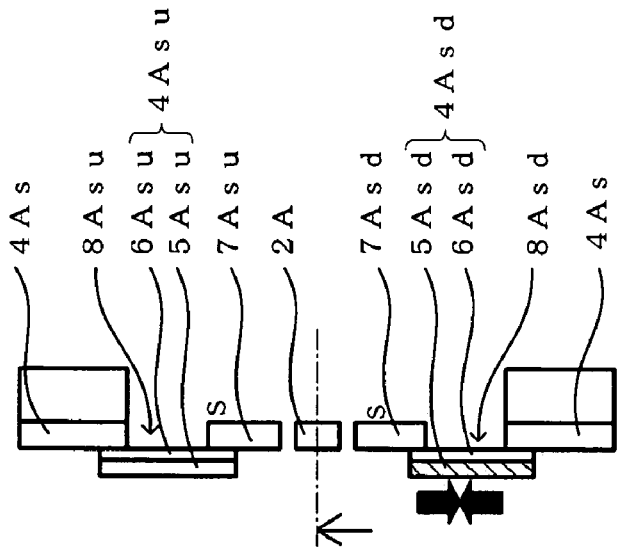
FIG. 8B
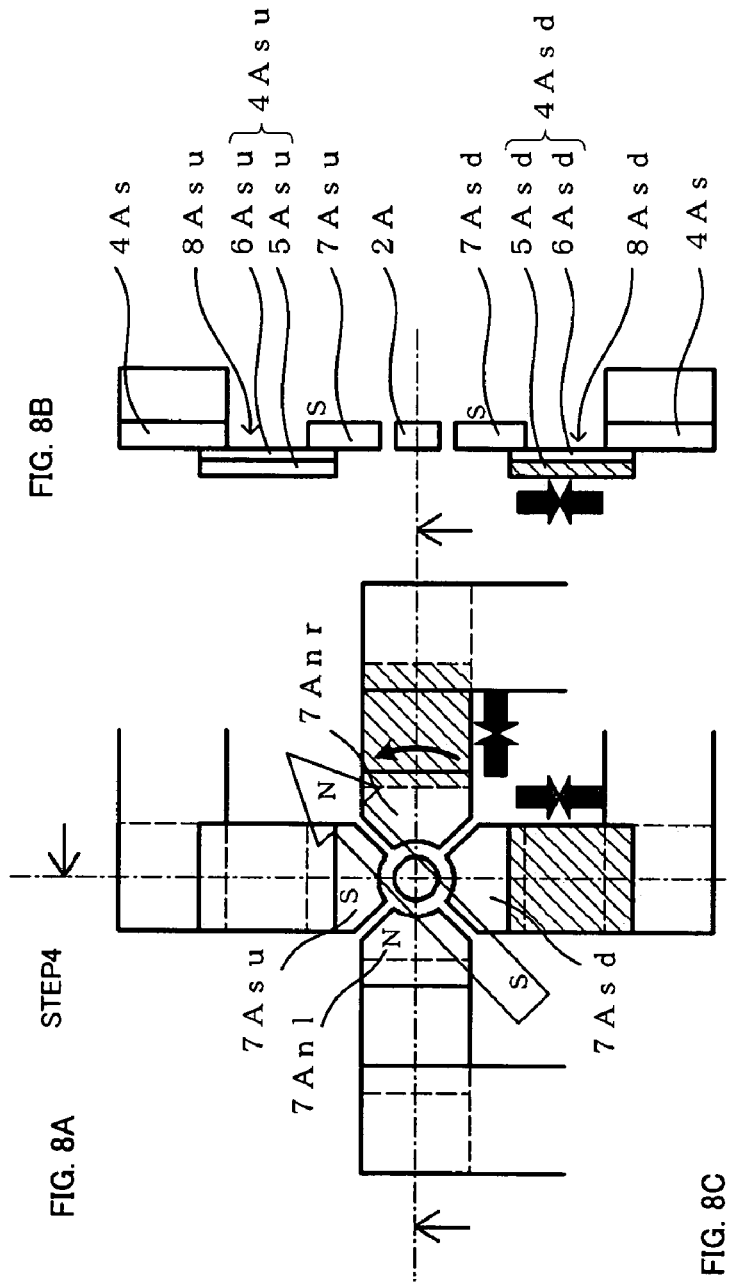
FIG. 8A  STEP4
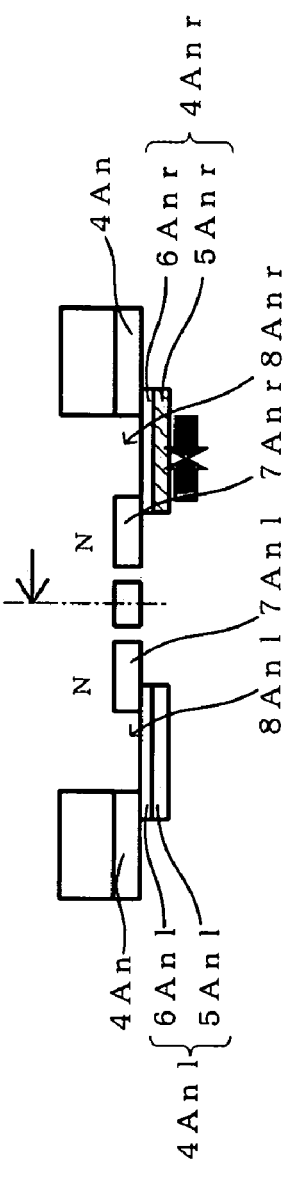
FIG. 8C

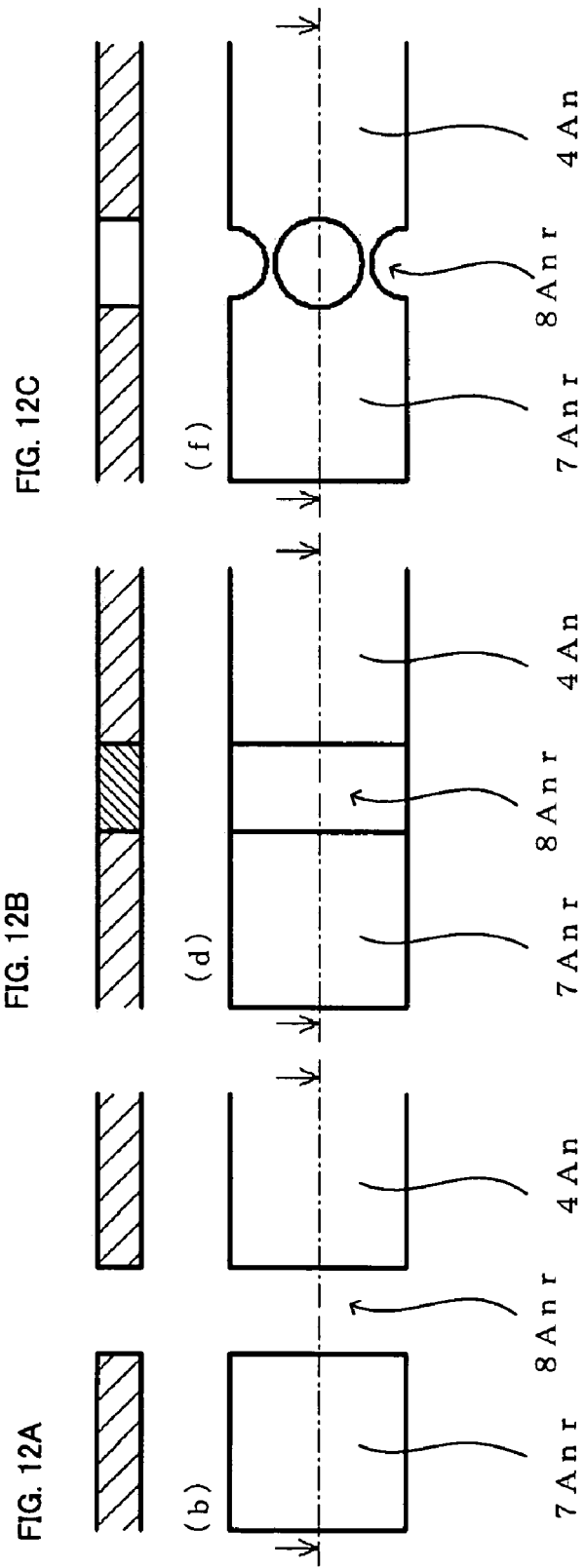

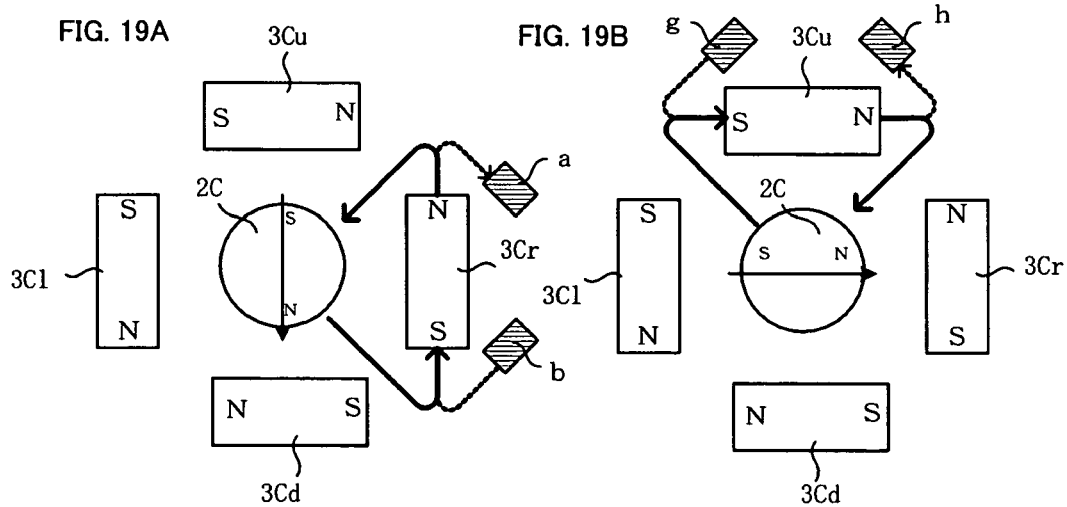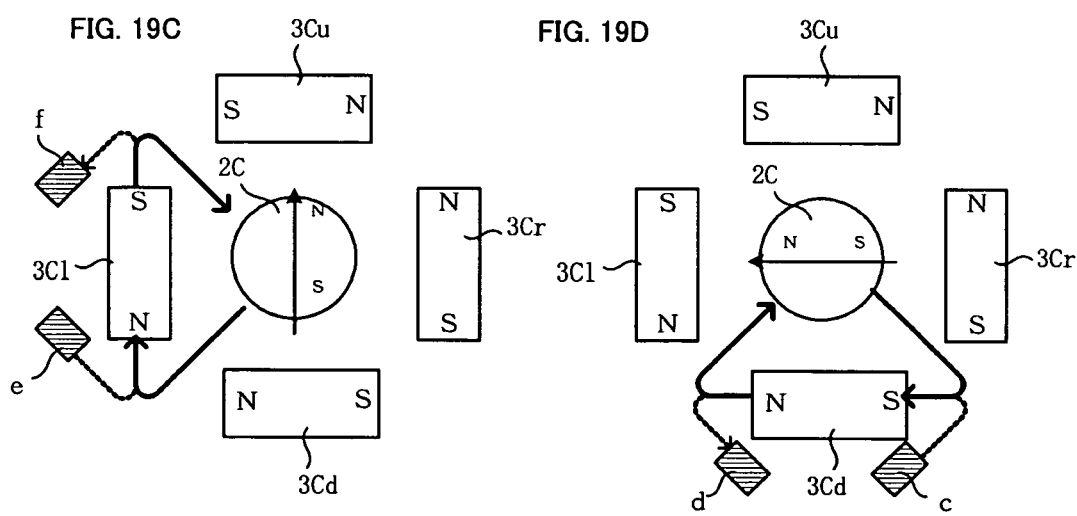

2 c 2 c
2 c 1
2 c 2

FIG. 30A
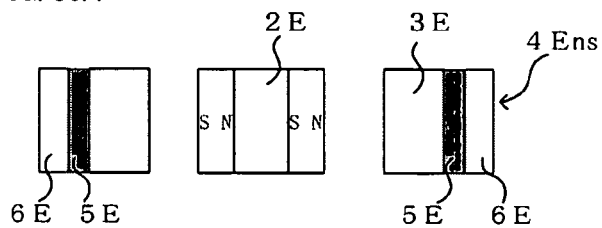
FIG. 30B  FIG. 30C
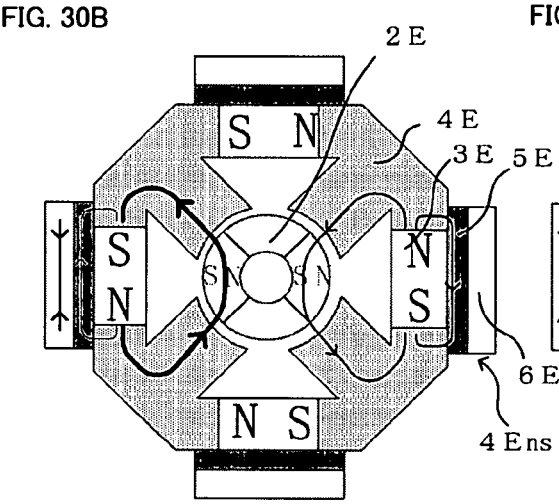 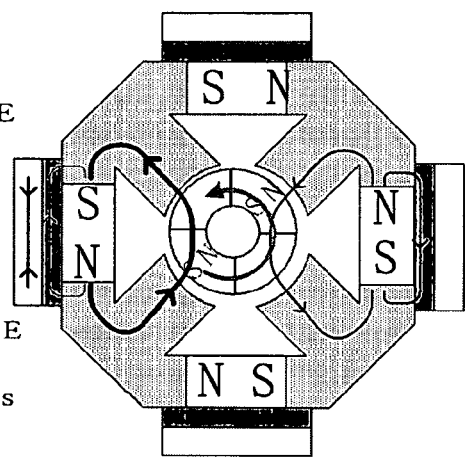
FIG. 30D  FIG. 30E
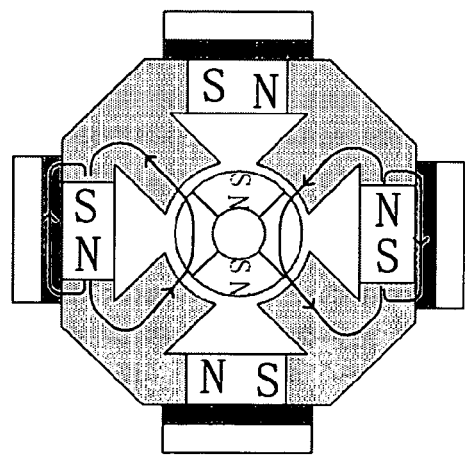 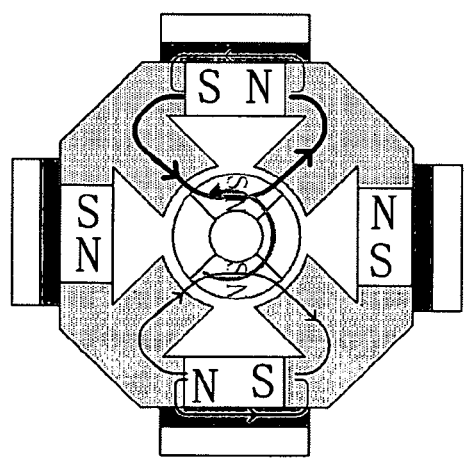

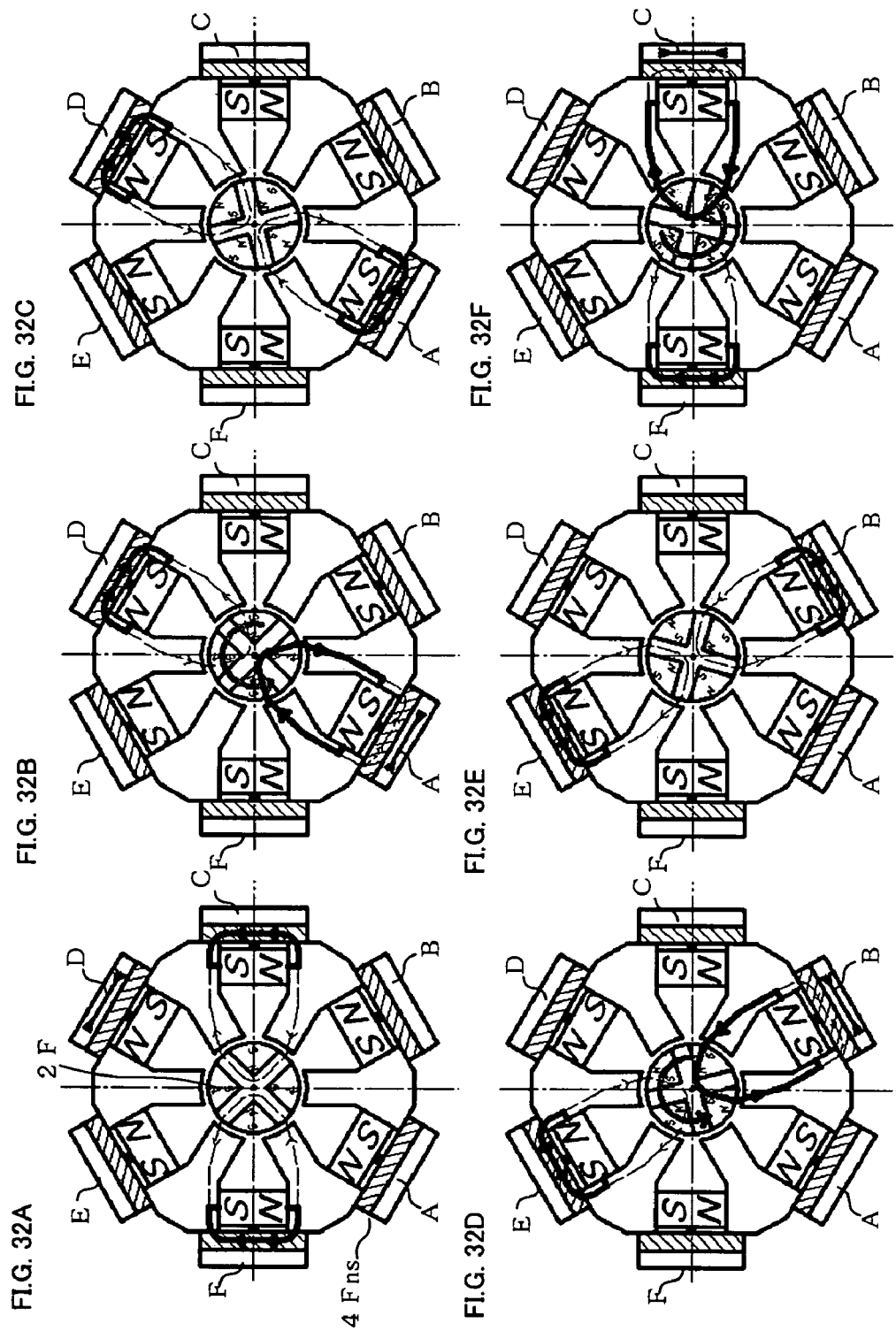

MAGNETIC DRIVE APPARATUS

BACKGROUND OF THE INVENTION

1. Field of the Invention

The present invention relates to a magnetic drive apparatus, and more particularly to a magnetic drive driving apparatus that does not require coil-based driving force.

2. Description of the Related Art

In a magnetic drive driving apparatus, which utilizes magnetic force, current is ordinarily supplied to an excitation coil to generate magnetic force, and this magnetic force rotates a rotor magnet. For example, a stepping motor is one such known magnetic drive driving apparatus. When this magnetic drive driving apparatus is used as the drive source for a clock, for example, it intermittently drives a stepping motor comprising the above-described constitution using reference signals generated via a quartz oscillator (For example, refer to Japanese Patent Laid-open No. 2002-90473 (page 1, FIG. 1)).

In a magnetic drive apparatus that uses an excitation coil such as that mentioned above, applying driving current to the excitation coil generates copper loss. This copper loss is problematic in that it does not allow high energy efficiency, and makes it difficult to reduce power consumption.

Further, in a magnetic drive apparatus that uses an excitation coil, the size of the apparatus is limited by the diameter of the coil and the flux saturation of the magnetic path. Thus, in order to make the magnetic drive apparatus smaller and thinner, it is necessary to decrease the size of the coil diameter, and to make the effective cross section of the magnetic path smaller. However, decreasing the coil diameter lowers torque, and reducing the effective cross section of the magnetic path results in the amount of magnetic flux being limited by flux saturation. Another problem with a magnetic drive apparatus is that it must be of a certain size in order to ensure torque of a prescribed magnitude.

Therefore, it is impossible to ensure torque of a prescribed magnitude in a magnetic drive apparatus while simultaneously striving to make the magnetic drive apparatus smaller and thinner.

As described hereinabove, the problems associated with a conventional magnetic drive apparatus, such as power consumption, restrictions placed on the amount of magnetic flux by flux saturation, and restrictions placed on compactness and thinness by the coil diameter, have their origins in the use of an excitation coil as the driving component.

Accordingly, with the foregoing problems in view, there has been proposed a driving device, which uses a magneto-resistance switching element to start and stop the flow of magnetic flux from a permanent magnet to a stator (Refer to Japanese Patent Laid-open No. 54-126917 (page 3, FIG. 2)).

A magnetic drive apparatus that uses an excitation coil as a driving source, as described hereinabove, is problematic in that using an excitation coil as a driving source results in high power consumption, and the coil diameter limits how compact and thin the magnetic drive apparatus can be made.

To solve for these problems, a driving method for controlling the ON/OFF of magnetic flux using a magneto-resistance switching element instead of a coil drive has been proposed in the above-mentioned Japanese Patent Laid-open No. 54-126917 (page 3, FIG. 2), but the problem with this driving method is that it uses a coil as the magneto-resistance switching element, and is therefore unable to achieve the effects of sufficient power saving, compactness and thinness.

Further, even if a magneto-resistance switching element that does not use a coil is utilized, the constitution proposed in Japanese Patent Laid-open No. 54-126917 (page 3, FIG. 2) is ON/OFF control, which controls whether the magnetic flux of a permanent magnet is allowed to flow to a stator or not, and as such, simply switches the flow of magnetic flux to the rotor in two directions.

Rotating the rotor requires that the direction of flux applied to the rotor be sequentially controlled in accordance with the direction of rotation. However, as mentioned above, control that simply switches the magnetic flux ON and OFF is a problem in that it is not possible to freely change the driving direction of the rotor, and is also problematic from the standpoint that it makes smooth driving control impossible.

Further, the fact that magnetic flux returns to the permanent magnet itself without traveling to the rotor when the magnetic flux is switched is also a problem in that the magnetic flux is not able to contribute to the driving of the rotor, making it difficult to realize high driving efficiency.

Further, it is difficult to fabricate a ferromagnetic material, such as a permanent magnet or magnetostrictive material to precise dimensions, and when a ferromagnetic material is incorporated into a magnetic path, magnetic flux leakage increases even with micro-sized gaps. This is also a problem in that strict dimensional accuracy is required for ferromagnetic materials, making the cost of fabrication and assembly very expensive.

Accordingly, an object of the present invention is to provide a magnetic drive apparatus that solves for these past problems, does not require an excitation coil, lowers power consumption by reducing energy consumption resulting from the copper loss of an excitation coil and so forth, and makes the driving apparatus smaller and thinner.

Further, in addition to the above-mentioned object, another object of the present invention is to provide a magnetic drive apparatus that achieves smooth driving control, and enhances driving efficiency. Yet another object of the present invention is to provide a low-cost magnetic drive apparatus for which strict dimensional precision is not required when using a material that is difficult to fabricate to precise dimensions.

SUMMARY OF THE INVENTION

To achieve the above-mentioned objects, a magnetic drive apparatus of the present invention fundamentally employs the constitution described hereinbelow.

A magnetic drive apparatus of the present invention switches the direction of magnetic flux applied to a rotor by controlling the amount of magnetic flux flowing through a magnetic guidepath. The control of the amount of magnetic flux in this magnetic guidepath can be carried out by controlling the magnetic permeability of the magnetic guidepath, and since the control of this magnetic permeability can be carried out without using an excitation coil, it is possible to reduce energy consumption resulting from the copper loss of the excitation coil, thereby lowering power consumption. Further, the control of magnetic permeability can be carried out using a reverse magnetostrictive effect that lowers the magnetic permeability of a magnetostrictive material, enabling the driving apparatus to be made smaller and thinner than an excitation coil or other such member for which volumetric capacity is required.

A magnetic drive apparatus of the present invention is a magnetic drive apparatus, which comprises a rotor having a rotor magnetic flux generator; and a stator having a stator magnetic flux generator, and a stator magnetic guidepath that guides the magnetic flux from the stator magnetic flux generator to the above-mentioned rotor, and which rotationally drives the rotor relative to the stator by controlling the flow of magnetic flux from the stator magnetic flux generator, and comprises magnetic flux controlling means for controlling the direction of magnetic flux relative to the rotor by controlling the amount of magnetic flux flowing through the stator magnetic guidepath. This magnetic flux controlling means is provided either in series with the stator magnetic guidepath, or parallel to the stator magnetic guidepath.

A first mode of the magnetic drive apparatus is a mode in which this magnetic flux controlling means is connected in series with the stator magnetic guidepath. In this first mode, magnetic flux controlling means decreases the amount of magnetic flux by reducing the magnetic permeability in the magnetic path of the stator magnetic guidepath. Since the amount of magnetic flux applied to a plurality of stator magnetic guidepaths connected to the same stator magnetic flux generator is equilibrated and allocated in accordance with the magnetostriction of each magnetic path, reducing the amount of magnetic flux of this stator magnetic guidepath increases the magnitude of the allocation of the amount of magnetic flux flowing to the other stator magnetic guidepath connected to the same stator magnetic flux generator.

Accordingly, the balance of the amount of magnetic flux flowing to the stator magnetic guidepaths arranged around the rotor changes, and driving force is applied to the rotor. The rotor rotates in accordance with sequentially changing the balance of this amount of magnetic flux.

A second mode of the magnetic drive apparatus is one in which this magnetic flux controlling means is connected in parallel to the stator magnetic guidepath. In this second mode, parallelly connecting magnetic flux controlling means to the stator magnetic guidepath forms a magnetic path, which is parallelly connected to the stator magnetic flux generator. The amount of magnetic flux is reduced by lowering the magnetic permeability of the parallelly connected magnetic flux controlling means. Because the amount of magnetic flux flowing to the parallelly connected stator magnetic guidepath and magnetic flux controlling means is equilibrated and allocated in accordance with the magnetostriction of each magnetic path, reducing the amount of magnetic flux flowing through this magnetic flux controlling means increases the magnitude of the allocation of the amount of magnetic flux that is flowing to a stator magnetic guidepath parallelly connected to the same stator magnetic flux generator.

Consequently, the balance of the amount of magnetic flux flowing to stator magnetic guidepaths arranged around the rotor changes, and driving force is applied to the rotor. The rotor rotates in accordance with sequentially changing the balance of this amount of magnetic flux.

In the first mode, the magnetic drive apparatus of the present invention comprises a rotor, which comprises a rotor magnetic flux generator, and a stator, which comprises a stator magnetic flux generator, and a stator magnetic guidepath for guiding the magnetic flux from this stator magnetic flux generator to the above-mentioned rotor, and rotationally drives the rotor relative to the stator by controlling the flow of magnetic flux of the stator magnetic flux generator.

A first gap is created between the rotor side end tip of the stator magnetic guidepath and the tip of a magnetic pole disposed at a prescribed angular location peripheral to the rotor, and magnetic flux controlling means is provided so as to bridge the space of this first gap. This magnetic flux controlling means is mounted by stacking it respectively on the stator magnetic guidepath end tip and the magnetic pole tip. According to the constitution of the present invention, since magnetic flux controlling means can be mounted to a stator magnetic guidepath by stacking one end of magnetic flux controlling means on the end tip of a stator magnetic guidepath, and stacking the other end on the tip of the magnetic pole, there is no need for an operation that matches the dimensions of magnetic flux controlling means to the dimensions of the space of the gap, enabling the mounting of magnetic flux controlling means to the stator magnetic guidepath to be carried out easily.

Magnetic flux controlling means is characterized by having a function for magnetically reconnecting to the tip of a magnetic pole after controlling the flow of magnetic flux, which is blocked by the first gap.

Further, a magnetic drive apparatus of the present invention is characterized in that the above-described stator magnetic guidepath is constituted by a first stator magnetic guidepath for guiding the magnetic flux of the one side of the stator magnetic flux generator to the rotor, and a second stator magnetic guidepath for guiding the magnetic flux of the other side of the stator magnetic flux generator to the rotor, and the stator magnetic flux generator is provided bridging a second gap formed between the first and second stator magnetic guidepaths.

According to the constitution of the present invention, using the stator magnetic flux generator to bridge the second gap between the first and second stator magnetic guidepaths eliminates the need for an operation that matches the dimensions of the stator magnetic flux generator to the dimensions of the space of the gap, enabling the mounting of the stator magnetic flux generator to the stator magnetic guidepath to be carried out easily the same as the constitution in which magnetic flux controlling means is mounted to a stator magnetic guidepath.

Further, the magnetic drive apparatus of the present invention is characterized in that the above-described first stator magnetic guidepath is constituted such that magnetic flux of the one side is guided to the rotor by way of the respective magnetic pole tips of a single magnetic pole, which divides the magnetic flux of the one side of the stator magnetic flux generator into a plurality in mid-flow, and the second stator magnetic guidepath is constituted such that magnetic flux of the other side is guided to the rotor by way of the respective magnetic pole tips of a single magnetic pole, which divides the magnetic flux of the other side of the stator magnetic flux generator into a plurality in mid-flow.

The first stator magnetic guidepath and the second stator magnetic guidepath are constituted for dividing magnetic flux into a plurality in mid-flow, and guide this divided magnetic flux to the rotor from the respective magnetic pole tips of a single magnetic pole, and switch the magnetic pole tips that guide the magnetic flux, by switching the divided flow, thereby rotationally driving the rotor.

Dividing the magnetic flux and switching the divided magnetic flux, which is guided to the rotor, makes it possible to reduce the quantity of stator magnetic flux generators.

Further, the magnetic drive apparatus of the present invention is characterized in that a non-magnetic material is provided in the above-mentioned second gap (the gap between the first and second stator magnetic guidepaths on which the stator magnetic flux generator is provided).

Providing a non-magnetic material in the second gap reduces magnetostriction irregularities in the magnetic path.

Further, the magnetic drive apparatus of the present invention is characterized in that the above-mentioned second gap is constituted such that the magnetic flux guided to the first and second stator magnetic guidepaths saturates.

Saturating the magnetic flux of the second gap makes it possible to reduce magnetostriction irregularities in the magnetic path.

Further, the magnetic drive apparatus of the present invention is characterized in that the above-mentioned magnetic flux controlling means controls the flow of magnetic flux to the tip of a magnetic pole by controlling the magnetic characteristics of a stator magnetic guidepath, and rotationally drives the rotor relative to the stator by switching the strong/weak balance of the respective positive and negative magnetic poles, which is manifested in the magnetic pole tips.

This magnetic flux controlling means is for controlling the magnetic characteristics of the stator magnetic guidepath, and can achieve high energy efficiency without generating energy loss due to the copper loss caused by the flow of current in an excitation coil.

Further, a magnetic drive apparatus of the present invention is characterized in that the above-described magnetic flux controlling means comprises a magnetostrictive material, the magnetic characteristics of which can be changed by applying stress, and a piezoelectric material, which adjoins and applies stress to the magnetostrictive material.

When voltage is applied to the piezoelectric material, the piezoelectric material expands and contracts, applying stress to the adjoining magnetostrictive material. The magnetic characteristics of the magnetostrictive material to which the stress is being applied change. For example, when compressive stress is applied to the magnetostrictive material, magnetic permeability is reduced by the reverse magnetostrictive effect, increasing magneto-resistance. Consequently, the amount of magnetic flux passing through this magnetic path decreases. Therefore, controlling the voltage applied to the piezoelectric material makes it possible to control the amount of magnetic flux passing along the magnetic path.

Further, the magnetic drive apparatus of the present invention is characterized in that a non-magnetic material is provided in the above-mentioned first gap (the gap between the rotor side end tip of a stator magnetic guidepath and the tip of a magnetic pole disposed at a prescribed angular location peripheral to the rotor).

Providing a non-magnetic material in the first gap makes it possible to reduce magneto-resistance irregularities along the magnetic path.

Further, the magnetic drive apparatus of the present invention is characterized in that the above-described first gap is constituted such that magnetic flux guided to the end tip of the stator magnetic guidepath saturates. Saturating the magnetic flux of the first gap makes it possible to reduce the magneto-resistance irregularities along the magnetic path.

In the second mode, the magnetic drive apparatus of the present invention comprises a rotor having a rotor magnetic flux generator, and a stator having a stator magnetic flux generator, and a stator magnetic guidepath for guiding the magnetic flux from this stator magnetic flux generator to the above-mentioned rotor, and rotationally drives the rotor relative to the stator by controlling the flow of magnetic flux of the stator magnetic flux generator.

Magnetic flux controlling means is provided between two stator magnetic guidepaths connected to the respective ends of the stator magnetic flux generator so as to parallelly bridge the space between these stator magnetic guidepaths. The amount of magnetic flux from the stator magnetic flux generator is allocated to the parallelly connected stator magnetic guidepaths and magnetic flux controlling means therebetween. By so doing, when the amount of magnetic flux flowing through magnetic flux controlling means changes, the amount of magnetic flux allocated to the parallelly connected stator magnetic guidepaths also changes. Consequently, controlling the amount of magnetic flux flowing through magnetic controlling means makes it possible to control the amount of magnetic flux allocated to the stator magnetic guidepaths.

This magnetic flux controlling means can also be mounted by respectively stacking it on the two stator magnetic guidepaths. According to this constitution, since magnetic flux controlling means can be mounted to the stator magnetic guidepaths by stacking the ends of magnetic flux controlling means onto the stator magnetic guidepaths, it is possible to eliminate the need for an operation that matches the dimensions of magnetic flux controlling means to the dimensions of the stator magnetic flux generator and stator magnetic guidepaths, enabling the mounting of magnetic flux controlling means to the stator magnetic guidepaths to be carried out easily.

Magnetic flux controlling means of the second mode of the present invention is characterized in that it controls the amount of magnetic flux allocated between the parallelly connected stator magnetic guidepaths by controlling magnetic characteristics, and rotationally drives the rotor relative to the stator by changing the strength of the respective magnetic poles, which is manifested in the magnetic pole tips of the stator magnetic guidepath provided facing the rotor side.

Here, the constitution can be such that the rotor is made of a soft magnetic material comprising a salient pole in the radial direction, and the two tips of the magnetic poles of the stator magnetic guidepath are arranged in the axial direction of the rotor. According to this constitution, a magnetic path can be formed in-plane in the axial direction, making it possible to suppress the dimensions in the radial direction.

Further, the same as in the first mode, magnetic flux controlling means of the second mode of the present invention can also be constituted using a magnetostrictive material, the magnetic characteristics of which can be changed by applying stress, and a piezoelectric material, which adjoins and applies stress to the magnetostrictive material.

According to the present invention, it is possible to make a driving apparatus that does not need an excitation coil in the magnetic drive apparatus.

Further, according to the present invention, eliminating the need for an excitation coil makes it possible to reduce power consumption by lowering the energy consumption resulting from the copper loss of the excitation coil and the like.

Further, according to the present invention, it is possible to make a driving apparatus smaller and thinner regardless of coil diameter.

Further, according to the present invention, strict dimensional precision is not required even when using a material that is difficult to fabricate to precise dimensions, enabling fabrication and assembly costs to be kept low.

BRIEF DESCRIPTION OF THE DRAWINGS

FIG. 5 is diagrams for illustrating the operating principle of a magnetic drive apparatus of the present invention (First Embodiment);

FIG. 7 is diagrams for illustrating the operating principle of a magnetic drive apparatus of the present invention (First Embodiment);

FIG. 8 is diagrams for illustrating the operating principle of a magnetic drive apparatus of the present invention (First Embodiment);

FIG. 12 is top views and cross-sectional views showing examples of a constitution of a first gap in a magnetic drive apparatus of the present invention (First Embodiment);

FIG. 19 is operational views showing an example of the second constitution comprising four stator magnetic flux generators of a magnetic drive apparatus of the present invention (Fourth Embodiment);

FIG. 30 is diagrams for illustrating the operation of examples of four pole constitutions, which form a magnetic path in-plane in the radial direction in a second mode of the present invention (Seventh Embodiment);

FIG. 32 is diagram for illustrating the operation of examples of multi-pole constitutions, which form a magnetic path in-plane in the radial direction in a second mode of the present invention (Eighth Embodiment).

DESCRIPTION OF THE PREFERRED EMBODIMENTS

Figure 1:
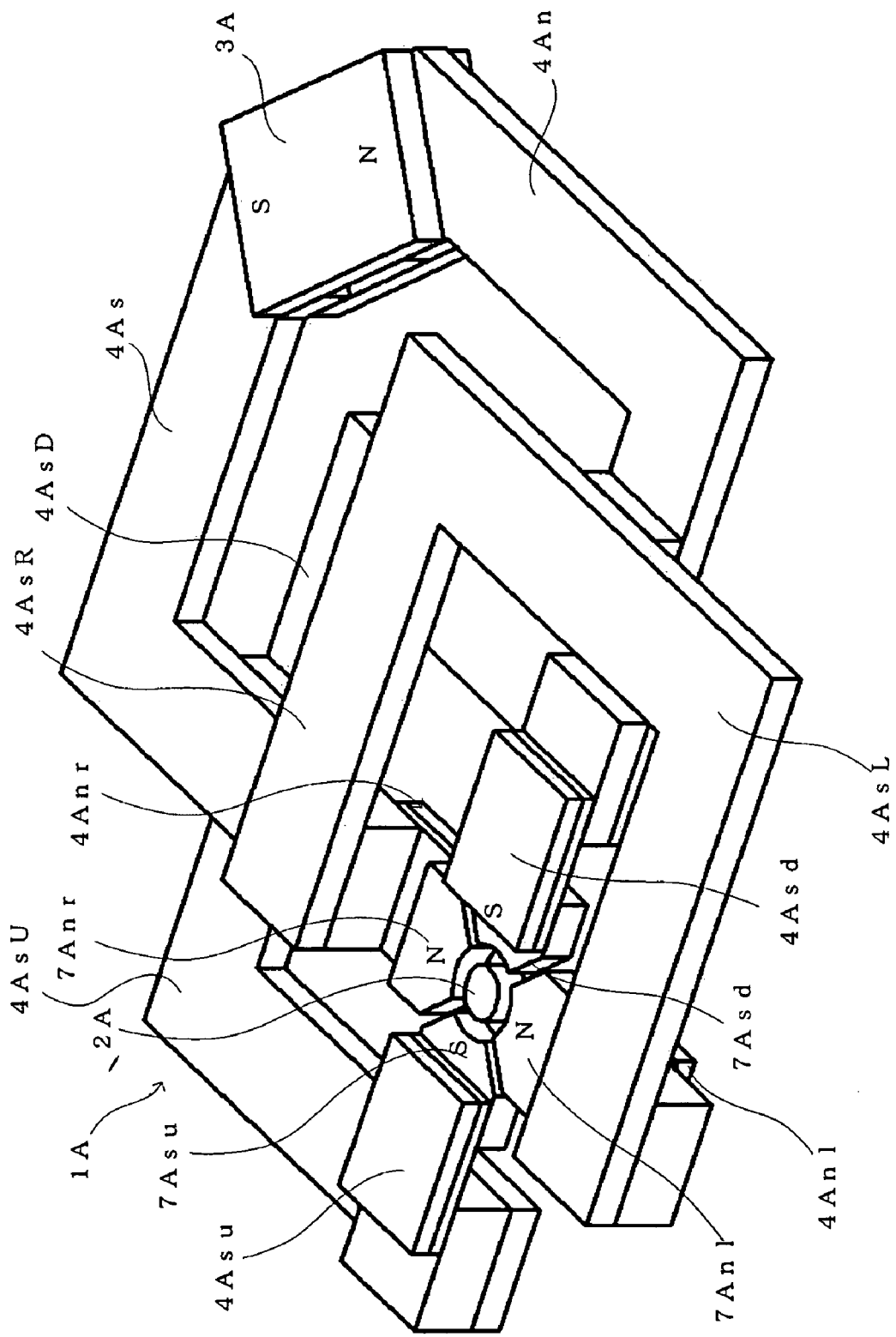
FIG. 1 is an oblique view showing an example of a constitution of a magnetic drive apparatus of the present invention (First Embodiment)

Next, the constitution and operation of a magnetic drive apparatus of the present invention will be explained. Below, a first mode, which connects magnetic flux controlling means in series to a stator magnetic guidepath, will be explained using FIGS. 1 through 22, and a second mode, which connects magnetic flux controlling means in parallel to a stator magnetic guidepath, will be explained using FIGS. 23 through 32.

Furthermore, in the first mode, an example of a constitution that utilizes a single stator magnetic flux generator will be explained using FIGS. 1 through 12, and an example of a constitution that utilizes a plurality of stator magnetic flux generators will be explained using FIGS. 13 through 22.

Further, in the second mode, an example of a constitution, which forms a magnetic path in-plane in the axial direction will be explained using FIGS. 26 through 28, and as an example of a constitution, which forms a magnetic path in-plane in the radial direction, an example of a four-pole constitution will be explained using FIGS. 29 and 30, and an example of a multi-pole constitution will be explained using FIGS. 31 and 32.

In a magnetic drive apparatus that uses an excitation coil, it is possible to switch poles by switching the direction of the current flowing in the excitation coil, but in a permanent magnet or other such magnetic flux generator, it is not possible to switch magnetic poles from the positive pole to the negative pole or from the negative pole to the positive pole by virtue of the current direction as with an excitation coil. Accordingly, in a magnetic drive apparatus of the present invention, the strong/weak balance of the respective magnetic poles, which is manifested at the tips of displaceable magnetic poles, is switched by controlling the flow of magnetic flux from a permanent magnet or other such magnetic flux generator instead of using a conventional excitation coil as the drive source, thereby constituting a driving apparatus that drives a magnetic member.

As the above-mentioned constitution, the present invention is constituted as a magnetic drive apparatus, which comprises a rotor having a rotor magnetic flux generator; and a stator having a stator magnetic flux generator, and a stator magnetic guidepath for guiding magnetic flux from this stator magnetic flux generator to the above-mentioned rotor, and which rotationally drives the rotor relative to the stator by controlling the flow of magnetic flux of the stator magnetic flux generator, comprising magnetic flux controlling means for controlling the direction of the magnetic flux relative to the rotor by controlling the amount of magnetic flux flowing through a stator magnetic guidepath. In addition to the first mode, in which magnetic flux controlling means is provided in series with a stator magnetic guidepath, it is also possible to have a second constitution in which magnetic flux controlling means is provide in parallel to a stator magnetic guidepath.

The first mode of the magnetic drive apparatus is one in which magnetic flux controlling means is serially connected to a stator magnetic guidepath. In this first mode, magnetic flux controlling means decreases the amount of magnetic flux by reducing the magnetic permeability in the magnetic path of a stator magnetic guidepath, thereby increasing the magnitude of the allocation of the amount of magnetic flux flowing in another stator magnetic guidepath, rotating the rotor by changing the balance of the amount of magnetic flux flowing to the stator magnetic guidepaths arranged peripherally to the rotor.

The second mode of the magnetic drive apparatuses one in which magnetic flux controlling means is parallelly connected to a stator magnetic guidepath. In this second mode, parallelly connecting magnetic flux controlling means to a stator magnetic guidepath forms a magnetic path, which is parallelly connected to the stator magnetic flux generator. Reducing the amount of magnetic flux by lowering the magnetic permeability of the parallelly connected magnetic flux controlling means increases the magnitude of the allocation of the amount of magnetic flux flowing in a parallelly connected stator magnetic guidepath, and rotates the rotor by changing the balance of the amount of magnetic flux flowing in the stator magnetic guidepaths arranged peripherally to the rotor.

More specifically, the first mode of the magnetic drive apparatus of the present invention is a magnetic drive apparatus, which comprises a rotor having a rotor magnetic flux generator; and a stator having a stator magnetic flux generator, and a stator magnetic guidepath for guiding the magnetic flux from this stator magnetic flux generator to the rotor, and which rotationally drives the rotor relative to the stator by controlling the flow of magnetic flux from the stator magnetic flux generator, and is constituted such that it further comprises magnetic flux controlling means, which is respectively stacked on and bridges the rotor side end tip part of a stator magnetic guidepath and the tip of a magnetic pole which is arranged at a prescribed angular location peripheral to the rotor with a first gap with this end tip part, and magnetic flux controlling means has a function for magnetically reconnecting to the tip of a magnetic pole after controlling the flow of magnetic flux, which is blocked by the first gap.

By employing the above-described constitution, magnetic flux controlling means controls the flow of magnetic flux to the tip of a magnetic pole by controlling the magnetic characteristics of the respective stator magnetic guidepaths, and switches the strong/weak balance of the respective positive and negative magnetic poles, which is manifested at these magnetic pole tips, making it possible to rotationally drive the rotor relative to the stator by changing the direction of the magnetic field with respect to the rotor by switching the strong/weak balance of the respective positive and negative magnetic poles.

Further, according to the constitution of the present invention, since it is possible to configure a driving apparatus that does not require an excitation coil, power consumption can be reduced by decreasing the energy consumption resulting from the copper loss of the excitation coil, which is essential in a conventional constitution. Then, the driving apparatus can be made smaller and thinner regardless of the coil diameter of an excitation coil.

Further, because a magnetic path is effectively constructed, the amount of magnetic flux leakage within the magnetic flux generated from the stator magnetic flux generator can be reduced, making it possible to increase the amount of magnetic flux that contributes toward driving the rotor and to enhance drive efficiency.

Further, in general, magnetic flux controlling means is a mode, which is arranged so as to bridge on different planes a stator magnetic guidepath, which are constituted from a soft magnetic material that is considered difficult to fabricate to precise dimensions, and the tip of a magnetic pole, and which magnetically links the stator magnetic guidepath and the tip of the magnetic pole, and as such, does away with the requirement for strict dimensional precision for this magnetic flux controlling means. Thus, fabrication and assembly costs can be kept low.

A concrete example of the constitution of the first mode will be explained in detail hereinbelow.

First Embodiment

Figure 2:
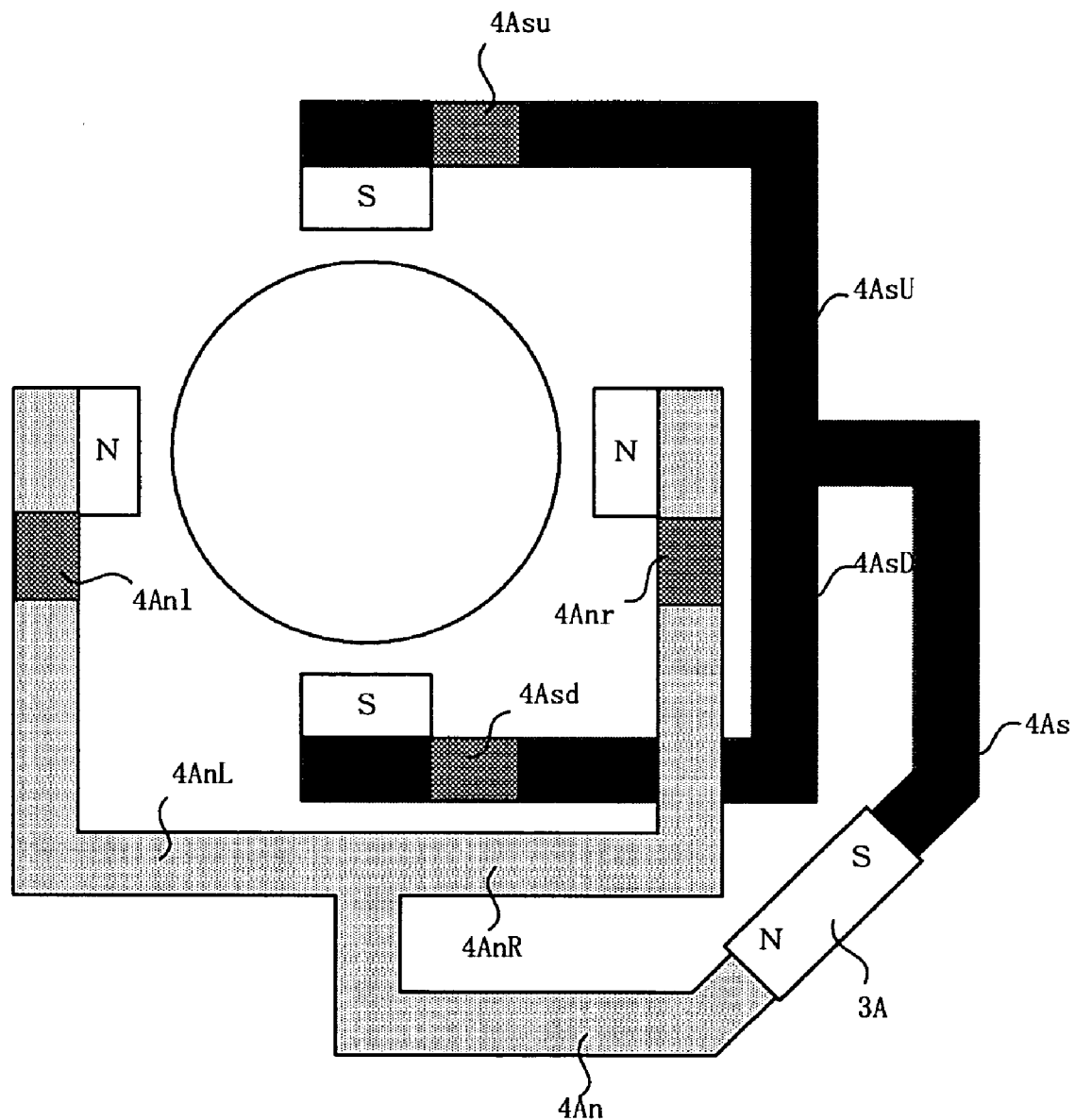
FIG. 2 is a simplified diagram showing stator magnetic guidepaths of an example of a constitution of a magnetic drive apparatus of the present invention (First Embodiment)

First, an example of a constitution and the operation of a magnetic drive apparatus of the present invention will be explained using FIGS. 1 through 12. FIG. 1 is an oblique view showing an example of a constitution of a magnetic drive apparatus of the present invention. FIG. 2 is a simplified diagram showing a stator magnetic guidepath of an example of a constitution of a magnetic drive apparatus, and FIG. 3 is simplified diagrams showing driving states according to an example of a constitution of a magnetic drive apparatus. Further, FIGS. 4 through 8 show an enlarged top view A of the vicinity of the rotor of this magnetic drive apparatus, and, on the right, a cross-sectional view B of this apparatus as seen from the right side, and at the bottom, a cross-sectional view C of this apparatus as seen from the bottom side.

As shown in FIG. 1, a magnetic drive apparatus 1A of the present invention is constituted from a rotor and a stator. Furthermore, a rotor magnetic flux generator 2A is presented as the rotor in this embodiment. In the following explanation, this rotor will be explained using the rotor magnetic flux generator 2A. This rotor magnetic flux generator 2A is such that arbitrary rotational force can be applied, and rotation controlled on the basis of an operating principle, which will be explained hereinbelow.

Further, the stator comprises a stator magnetic flux generator 3A; a stator magnetic guidepath 4A, which guides magnetic flux from the respective poles of the stator magnetic flux generator 3A to a rotor magnetic flux generator 2A; and magnetic flux controlling means for controlling the amount of magnetic flux of the stator magnetic guidepath 4A.

More specifically, the stator is constituted comprising a stator magnetic flux generator 3A; stator magnetic guidepaths 4An, 4As, which divide the flow of the magnetic flux from the respective poles of the stator magnetic flux generator 3A into a plurality, and respectively guide same to the rotor magnetic flux generator 2A; magnetic pole tips of single magnetic poles 7Anr, 7Anl, 7Asu, 7Asd, which are provided at the ends of these stator magnetic guidepaths 4An, 4As, and which are magnetically separated and positioned at prescribed angular locations around the periphery of the rotor magnetic flux generator 2A; first gaps 8Anr, 8Anl, 8Asu, 8Asd, which are disposed midway along and magnetically separate the respective stator magnetic guidepaths 4An, 4As on the same plane; and magnetic flux controlling means 4Anr, 4Anl, 4Asu, 4Asd, which are arranged on a different plane than the respective first gaps 8Anr, 8Anl, 8Asu, 8Asd, and which magnetically reconnect the respective stator magnetic guidepaths 4An, 4As by forming bridges across these first gaps.

Furthermore, the example of the constitution shown in FIG. 1 is an example of a constitution, which comprises one stator magnetic flux generator, and which branches the stator magnetic guidepath 4As, which extends from the one of the magnetic poles of the stator magnetic flux generator 3A, into two stator branch magnetic guidepaths 4AsU, 4AsD, and branches the stator magnetic guidepath 4An, which extends from the other of the magnetic poles of the stator magnetic flux generator 3A, into two stator branch magnetic guidepaths 4AnL, 4AnR. The respective magnetic flux controlling means 4Asu, 4Asd are disposed on the branched stator branch magnetic guidepaths 4AsU, 4AsD, and the respective magnetic flux controlling means 4Anl, 4Anr are disposed on the branched stator branch magnetic guidepaths 4AnL, 4AnR.

FIG. 2 shows a stator magnetic guidepath part, and, of the two poles (S pole and N pole) of the one stator magnetic flux generator 3A, the S pole is guided to the two stator branch magnetic guidepaths 4AsU, 4AsD, which branch from the stator magnetic guidepath 4As, and the N pole is guided to the two stator branch magnetic guidepaths 4AnL, 4AnR, which branch from the stator magnetic guidepath 4An.

The amount of magnetic flux of the magnetic flux guided to the stator branch magnetic guidepaths 4AsU, 4AsD is controlled and allocated by the respective magnetic flux controlling means 4Asu, 4Asd. Further, the amount of magnetic flux of the magnetic flux guided to the stator branch magnetic guidepaths 4AnL, 4AnR is controlled and allocated by the respective magnetic flux controlling means 4Anl, 4Anr.

These magnetic flux controlling means 4Anr, 4Anl, 4Asu, 4Asd are constituted from hereinbelow-explained magnetostrictive materials 6Anr, 6Anl, 6Asu, 6Asd, which constitute magnetic paths for magnetic flux to flow along the respective stator branch magnetic guidepaths, and the magnetic characteristics of which can be changed by applying stress, and piezoelectric materials 5Anr, 5Anl, 5Asu, 5Asd, which adjoin and apply stress to the respective magnetostrictive materials.

The magnetic drive apparatus 1A, which is constituted like this, controls the magnetic characteristics of the respective stator magnetic guidepaths 4An, 4As using the magnetic flux controlling means 4Anr, 4Anl, 4Asu, 4Asd. Controlling magnetic characteristics controls the flow of the magnetic flux to the magnetic pole tips 7Anr, 7Anl, 7Asu, 7Asd. Furthermore, controlling this magnetic flux flow switches the strong/weak balance of the respective positive and negative magnetic poles, which is manifested in the magnetic pole tips, and also switches the positive and negative strong/weak balance. As a result, the direction of the magnetic flux flowing between the respective magnetic pole tips 7Anr, 7Anl, 7Asu, 7Asd is effectively switched via the rotor magnetic flux generator 2A. The consequent switching of the magnetic flux direction changes the direction of the magnetic flux that flows from the magnetic pole tips 7Anr, 7Anl, 7Asu, 7Asd, which are arranged at prescribed angular locations around the periphery of the rotor magnetic flux generator 2A, to the rotor magnetic flux generator 2A, which is arranged between these magnetic pole tips, causing a driving force for rotationally driving the rotor to function.

FIG. 3 shows this drive state. In FIG. 3A, the S pole of the stator magnetic flux generator 3A is guided to the one of the S poles along the stator branch magnetic guidepath 4AsU, and the N pole of the stator magnetic flux generator 3A is guided to the one of the N poles along the stator branch magnetic guidepath 4AnR.

Figure 3A:
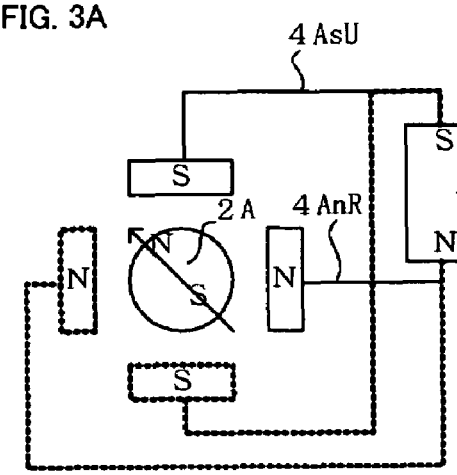
FIG. 3 is simplified diagrams showing driving states according to an example of a constitution of a magnetic drive apparatus of the present invention (First Embodiment)
Figure 3B:
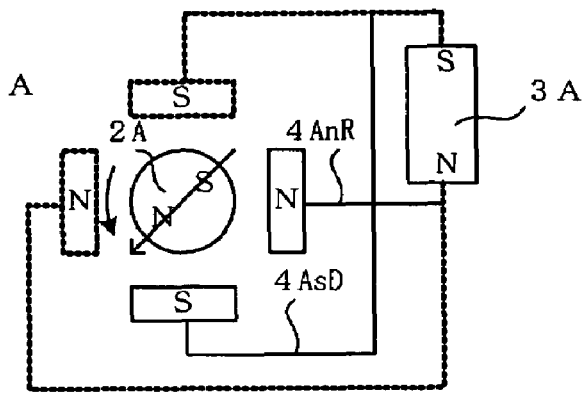

In FIG. 3B, the S pole of the stator magnetic flux generator 3A is guided to the other of the S poles along the stator branch magnetic guidepath 4AsD, and the N pole of the stator magnetic flux generator 3A is guided to the one of the N poles along the stator branch magnetic guidepath 4AnR.

Figure 3C:
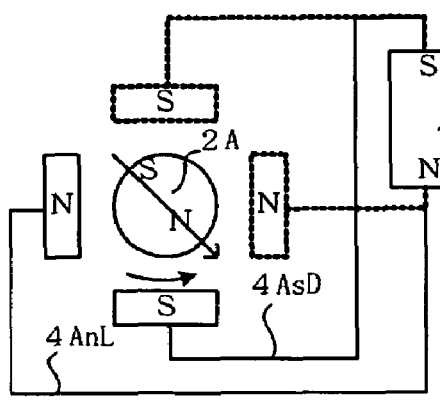

In FIG. 3C, the S pole of the stator magnetic flux generator 3A is guided to the other of the S poles along the stator branch magnetic guidepath 4AsD, and the N pole of the stator magnetic flux generator 3A is guided to the other of the N poles along the stator branch magnetic guidepath 4AnL.

Figure 3D:
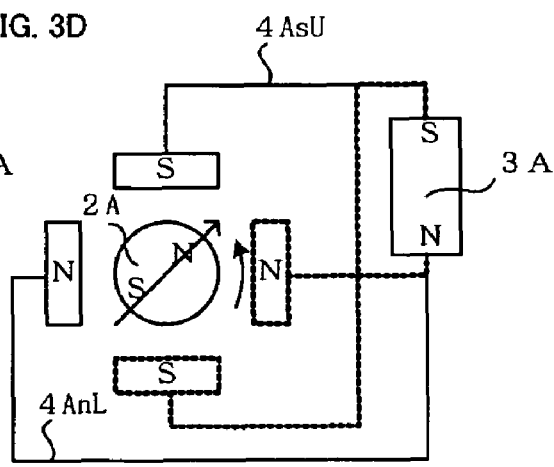

In FIG. 3D, the S pole of the stator magnetic flux generator 3A is guided to the one of the S poles along the stator branch magnetic guidepath 4AsU, and the N pole of the stator magnetic flux generator 3A is guided to the other of the N poles along the stator branch magnetic guidepath 4AnL.

The rotor, which comprises the rotor magnetic flux generator 2A, moves and rotates in accordance with the direction stipulated by the magnetic flux direction formed by the above-mentioned respective S poles and N poles.

Here, the respective steps (STEP0 through STEP4) for rotationally driving the rotor magnetic flux generator 2A in the magnetic drive apparatus 1A of the present invention will be explained in order using FIGS. 4 through 8.

Figures 4A, 4B, 4C:
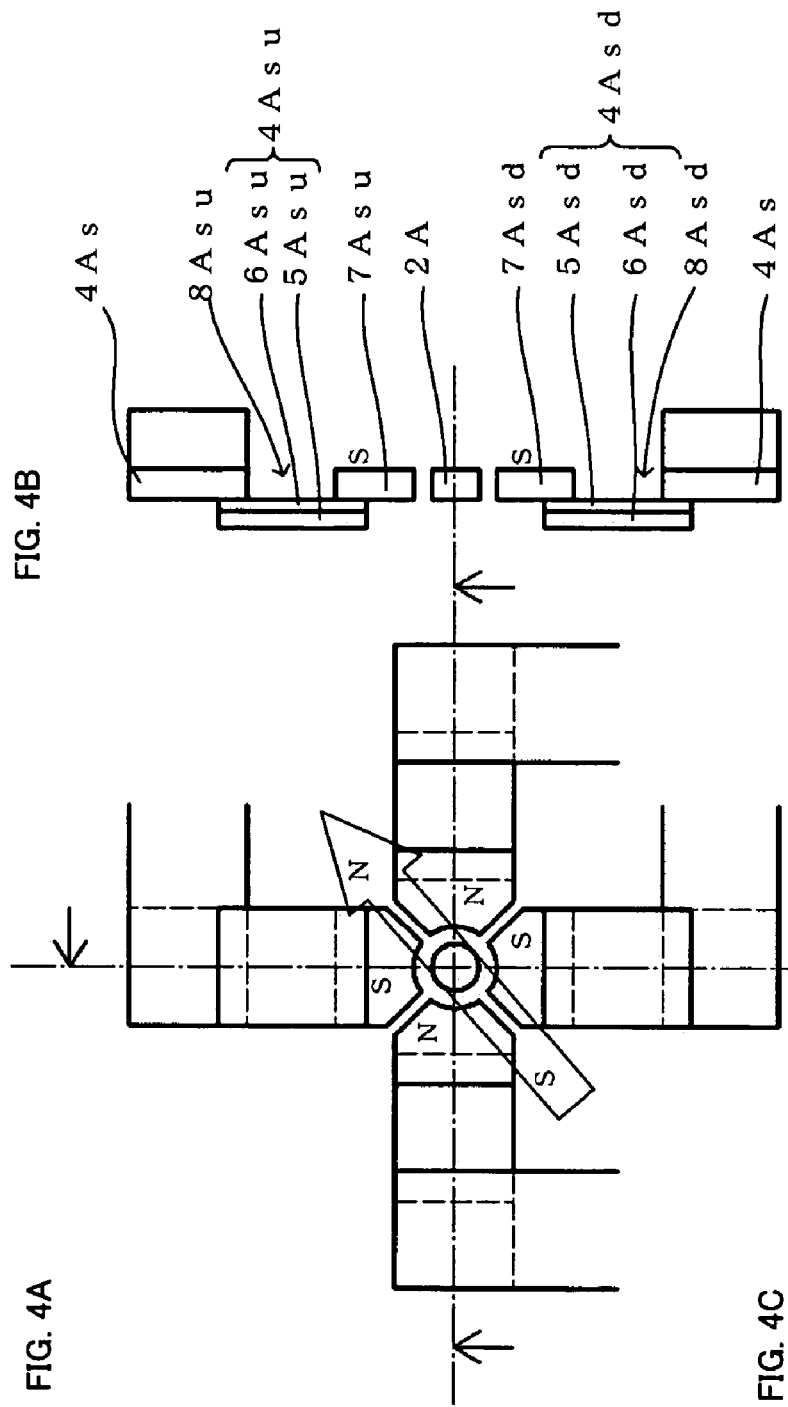
FIG. 4 is an enlarged view and cross-sectional views of the vicinity of a rotor of a magnetic drive apparatus of the present invention (First Embodiment)
Figure 6B:
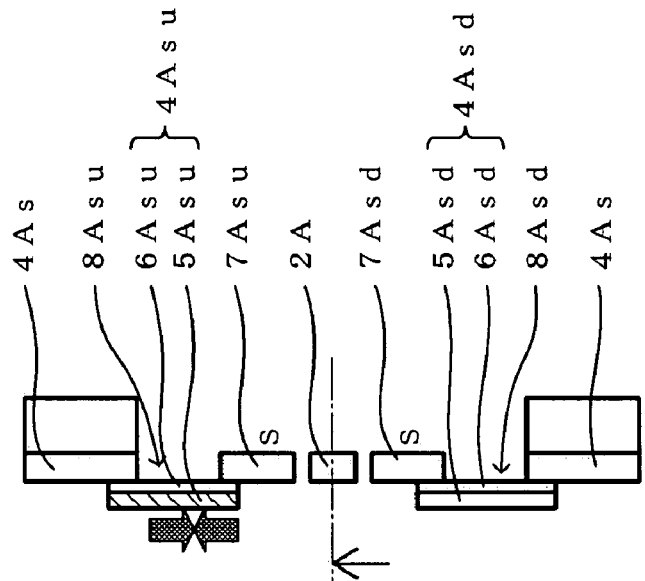
FIG. 6 is diagrams for illustrating the operating principle of a magnetic drive apparatus of the present invention (First Embodiment)
Figure 6A:
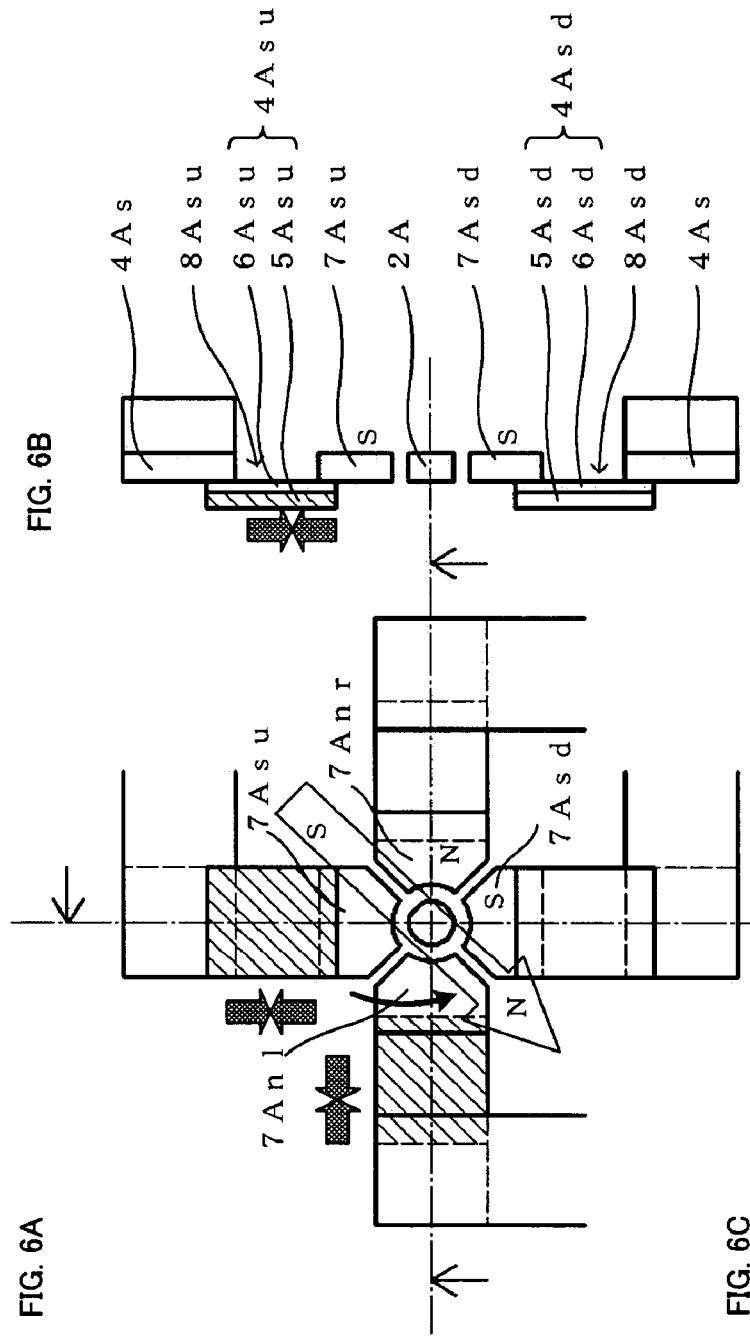
Figure 6C:
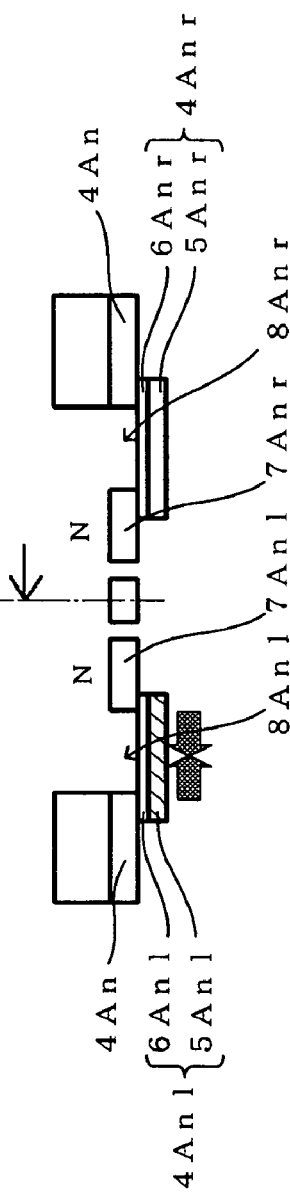

FIGS. 4 through 8 are diagrams for explaining the operating principle of the magnetic drive apparatus 1A of the present invention, and in the respective figures (FIGS. 4 through 8), the enlarged view A in the center shows the vicinity of the rotor of the magnetic drive apparatus, the cross-sectional view B on the right shows this apparatus as seen from the right side, and the cross-sectional view C at the bottom shows this apparatus as seen from the bottom side. Furthermore, FIG. 4 shows the state of STEP0, FIG. 5 shows the state of STEP1, FIG. 6 shows the state of STEP2, FIG. 7 shows the state of STEP3, and FIG. 8 shows the state of STEP4, which will be explained below. Further, the hash-filled arrows in the figures show the stress application directions of the magnetic flux controlling means, and the white-filled arrows inside them show the magnetic pole direction of the rotor magnetic flux generator 2A.

STEP0 shown in FIG. 4 shows a stationary, stable state in which none of the magnetic flux controlling means 4Anr, 4Anl, 4Asu, 4Asd are operating. In this state, the amounts of magnetic flux at the divided flow destinations, which was divided at the stator magnetic flux generator 3A (not shown in the figure), are equal, and each of the N pole, N pole, S pole and S pole of the respective magnetic poles manifest this magnetic flux in equal degrees at the magnetic pole tips 7Anr, 7Anl, 7Asu, 7Asd. Thus, the rotor magnetic flux generator 2A is in balance and stationary at the position shown in FIG. 4. Then, subsequent to going through the steps from STEP 1 to STEP 4 explained hereinbelow, the rotor magnetic flux generator 2A returns once again to the state of STEP0, and by repeating the respective steps in order, the sustained rotational drive of the rotor magnetic flux generator 2A becomes possible.

Next, in STEP1 shown in FIG. 5, stress is applied to the magnetostrictive materials 6Anl, 6Asd by operating the piezoelectric materials 5Anl, 5Asd, from which the magnetic flux controlling means 4Anl, 4Asd are comprised. The magnetic permeability of the magnetic characteristics of the magnetostrictive materials 6Anl, 6Asd changes in accordance with the applied stress, and the magnetic resistance of the magnetic path from the magnetic pole tips 7Anl, 7Asd to the rotor magnetic flux generator 2A increases. In accordance therewith, the amounts of flux of the magnetic pole tips 7Anr, 7Asu, which are the destinations of one more divided flow from the stator magnetic flux generator 3A, increase. Consequently, for the N poles, the magnetic flux is manifested more strongly at the magnetic pole tip 7Anr than at the magnetic pole tip 7Anl, and for the S poles, the magnetic flux is manifested more strongly at the magnetic pole tip 7Asu than at the magnetic pole tip 7Asd. As a result, the magnetic flux of the magnetic pole tips 7Anr, 7Asu act on the rotor magnetic flux generator 2A, and can rotate the rotor magnetic flux generator 2A (rotating counterclockwise in the figure) until the balanced state of STEP1 shown in FIG. 5.

Next, in STEP2 shown in FIG. 6, stress is applied to the magnetostrictive materials 6Anl, 6Asu by operating the piezoelectric materials 5Anl, 5Asu, from which the magnetic flux controlling means 4Anl, 4Asu are comprised. The magnetic permeability of the magnetic characteristics of the magnetostrictive materials 6Anl, 6Asu changes in accordance with the applied stress, and the magnetic resistance of the magnetic path from the magnetic pole tips 7Anl, 7Asu to the rotor magnetic flux generator 2A increases. In accordance therewith, the amounts of flux of the magnetic pole tips 7Anr, 7Asd, which are the destinations of one more divided flow from the stator magnetic flux generator 3A, increase. Consequently, for the N poles, the magnetic flux is manifested more strongly at the magnetic pole tip 7Anr than at the magnetic pole tip 7Anl, and for the S poles, the magnetic flux is manifested more strongly at the magnetic pole tip 7Asd than at the magnetic pole tip 7Asu. As a result, the magnetic flux of the magnetic pole tips 7Anr, 7Asd act on the rotor magnetic flux generator 2A, and can rotate the rotor magnetic flux generator 2A (rotating counterclockwise in the figure) until the balanced state of STEP2 shown in FIG. 6. Furthermore, this state constitutes a state in which the rotor magnetic flux generator 2A has rotated 180 degrees from the STEP0 of FIG. 4.

Next, in STEP3 shown in FIG. 7, stress is applied to the magnetostrictive materials 6Anr, 6Asu by operating the piezoelectric materials 5Anr, 5Asu, from which the magnetic flux controlling means 4Anr, 4Asu are comprised. The magnetic permeability of the magnetic characteristics of the magnetostrictive materials 6Anr, 6Asu changes in accordance with the applied stress, and the magnetic resistance of the magnetic path from the magnetic pole tips 7Anr, 7Asu to the rotor magnetic flux generator 2A increases. In accordance therewith, the amounts of flux of the magnetic pole tips 7Anl, 7Asd, which are the destinations of one more divided flow from the stator magnetic flux generator 3A, increase. Consequently, for the N poles, the magnetic flux is manifested more strongly at the magnetic pole tip 7Anl than at the magnetic pole tip 7Anr, and for the S poles, the magnetic flux is manifested more strongly at the magnetic pole tip 7Asd than at the magnetic pole tip 7Asu. As a result, the magnetic flux of the magnetic pole tips 7Anr, 7Asd act on the rotor magnetic flux generator 2A, and can rotate the rotor magnetic flux generator 2A (rotating counterclockwise in the figure) until the balanced state of STEP3 shown in FIG. 7.

Next, in STEP4 shown in FIG. 8, stress is applied to the magnetostrictive materials 6Anr, 6Asd by operating the piezoelectric materials 5Anr, 5Asd, from which the magnetic flux controlling means 4Anr, 4Asd are comprised. The magnetic permeability of the magnetic characteristics of the magnetostrictive materials 6Anr, 6Asd changes in accordance with the applied stress, and the magnetic resistance of the magnetic path from the magnetic pole tips 7Anr, 7Asd to the rotor magnetic flux generator 2A increases. In accordance therewith, the amounts of flux of the magnetic pole tips 7Anl, 7Asu, which are the destinations of one more divided flow from the stator magnetic flux generator 3A, increase. Consequently, for the N poles, the magnetic flux is manifested more strongly at the magnetic pole tip 7Anl than at the magnetic pole tip 7Anr, and for the S poles, the magnetic flux is manifested more strongly at the magnetic pole tip 7Asu than at the magnetic pole tip 7Asd. As a result, the magnetic flux of the magnetic pole tips 7Anl, 7Asu act on the rotor magnetic flux generator 2A, and can rotate the rotor magnetic flux generator 2A (rotating counterclockwise in the figure) until the balanced state of STEP4 shown in FIG. 8. Furthermore, this state constitutes a state in which the rotor magnetic flux generator 2A has rotated 360 degrees from the STEP0 of FIG. 4.

As explained hereinabove, repeating the steps STEP0 through STEP4 makes it possible to rotate the rotor magnetic flux generator 2A.

Next, the constitutions and operations of the piezoelectric materials 5Anr, 5Anl, 5Asu, 5Asd, and magnetostrictive materials 6Anr, 6Anl, 6Asu, 6Asd, which are the components of magnetic flux controlling means 4Anr, 4Anl, 4Asu, 4Asd in the magnetic drive apparatus 1A of the present invention, will be explained giving magnetic flux controlling means 4Anr as an example.

Figure 9A:
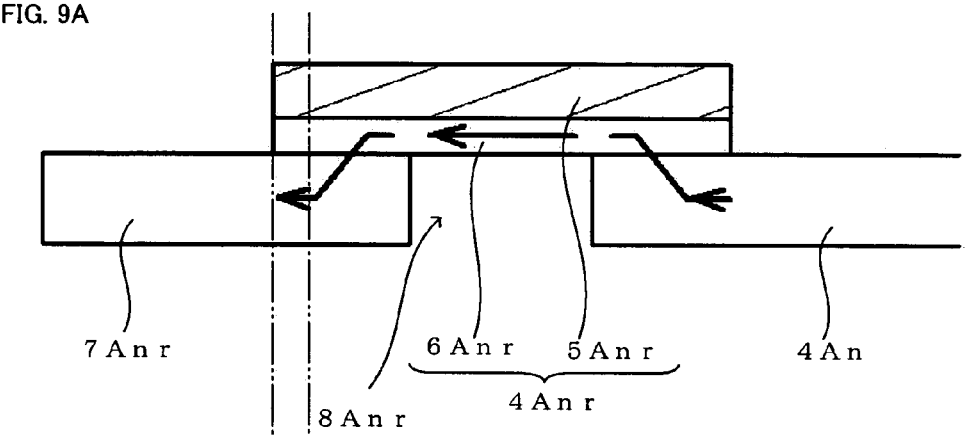
FIG. 9 is cross-sectional views for illustrating the operation of a magnetic drive apparatus of the present invention (First Embodiment)
Figure 9B:
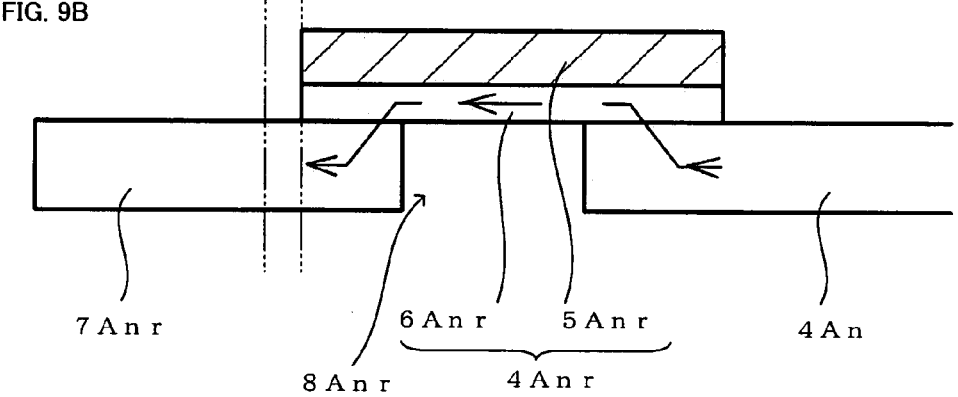

FIG. 9 is a diagram for explaining examples of the constitutions of magnetic pole tip 7Anr, stator magnetic guidepath 4An, and magnetic flux controlling means 4Anr, and their operating principles. In this diagram, the top view (FIG. 9A) shows the state of prior to the piezoelectric material 5Anr being actuated, and the bottom view (FIG. 9B) shows the state of subsequent to the piezoelectric material 5Anr being actuated. Furthermore, since the constitutions of magnetic flux controlling means 4Anl, 4Asu, 4Asd, which are not shown in this diagram, are all the same as the magnetic flux controlling means 4Anr, explanations thereof will be omitted here.

The magnetic pole tip 7Anr and stator magnetic guidepath 4An shown in FIG. 9 are both made from permalloy or some other such soft magnetic material, and form a magnetic path through which magnetic flux flows. Then, magnetic flux controlling means 4Anr is stacked on, brought in contact with and attached to the magnetic pole tip 7Anr and the stator magnetic guidepath 4An, and can actuate in the direction of the arrows shown in this figure. Further, magnetic flux controlling means 4Anr is constituted by stacking and bonding the piezoelectric material 5Anr and the magnetostrictive material 6Anr. The piezoelectric material 5Anr is made from a material that can be displaced by applying an electric field. Then, as shown in this figure, compressive stress is applied to the adjoining magnetostrictive material 6Anr by compressively displacing this piezoelectric material 5Anr. The magnetic permeability of the magnetostrictive material 6Anr changes in accordance with a reverse magnetostrictive effect when compressive stress is applied.

In the state prior to actuating the piezoelectric material 5Anr shown in FIG. 9A, compressive stress is not being applied to the magnetostrictive material 6Anr, so that there is no apparent drop in magnetic permeability, and a prescribed amount of magnetic flux is flowing.

Conversely, in the state subsequent to actuating the piezoelectric material 5Anr shown in FIG. 9B, compressive stress is being applied to the magnetostrictive material 6Anr, causing magnetic permeability to drop, and reducing the amount of magnetic flux.

In accordance with the above-described operation, magnetic flux controlling means 4Anr is able to control the amount of magnetic flux that flows to the magnetic pole tip 7Anr.

In a magnetic drive apparatus of the present invention, when integrating a stator magnetic flux generator and magnetic flux controlling means relative to a stator magnetic guidepath, which constitutes a magnetic path, a gap is formed partway along the stator magnetic guidepath, and this gap is bridged by the stator magnetic flux generator and magnetic flux controlling means. By using a constitution that uses this bridge to span the gap, there is no need to process the stator magnetic guidepath, stator magnetic flux generator, or magnetic flux controlling means to high-precision dimensions, and the stator magnetic flux generator and magnetic flux controlling means can easily be attached to the stator magnetic guidepath.

Next, an example of a constitution for bridging stator magnetic guidepaths 4An, 4As using the stator magnetic flux generator 3A, and an example of a constitution for bridging stator magnetic guidepaths 4An, 4As and magnetic pole tips 7Anr, 7Anl, 7Asu, 7Asd using magnetic flux controlling means 4Anr, 4Anl, 4Asu, 4Asd, in the magnetic drive apparatus 1A of the present invention, will be explained using FIGS. 10 and 11.

First, an example of a constitution for attaching the stator magnetic flux generator 3A to stator magnetic guidepaths as a bridge will be explained using FIG. 10.

Figure 10A:
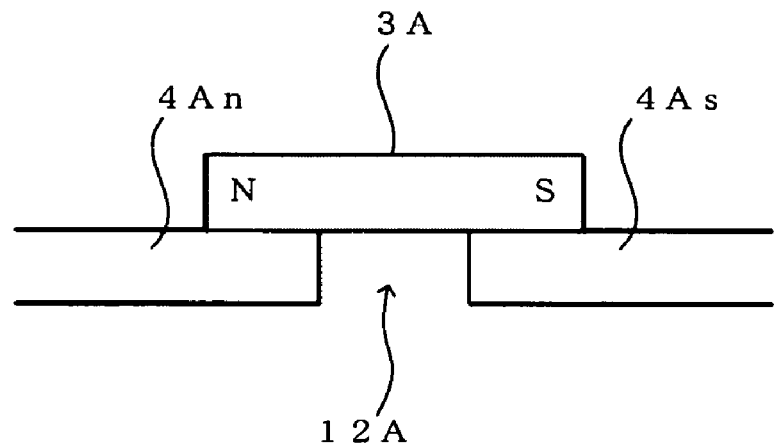
FIG. 10 is cross-sectional views showing examples of a constitution of a magnetic drive apparatus of the present invention (First Embodiment)
Figure 10B:
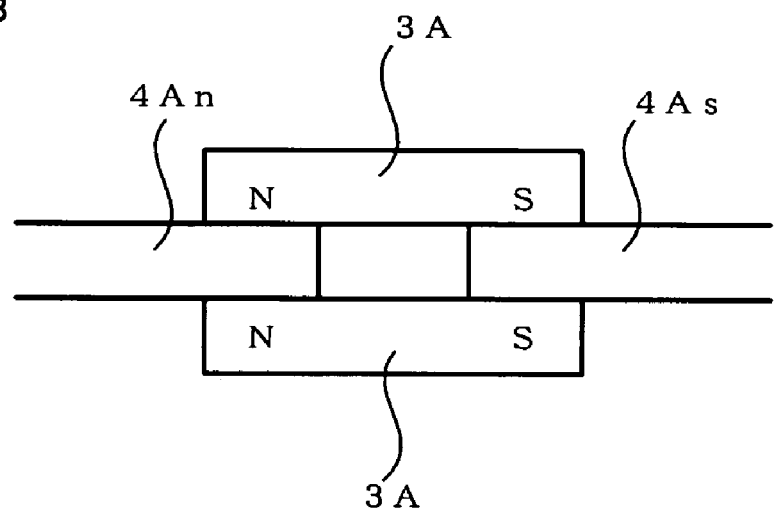
Figure 10C:
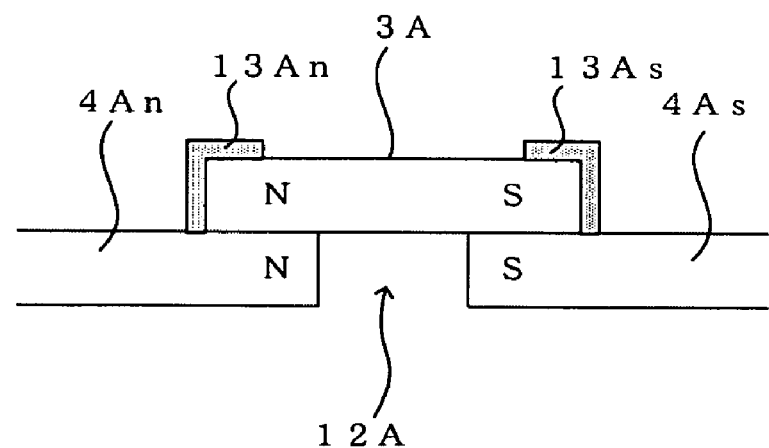

FIG. 10 shows an example of a constitution, which uses the stator magnetic flux generator 3A to bridge two separated stator magnetic guidepaths 4An, 4As via a second gap 12A using, and FIG. 10A shows an example of a constitution, which arranges one stator magnetic flux generator 3A across this second gap 12A. FIG. 10B shows an example of a constitution, which arranges two stator magnetic flux generators 3A across this second gap 12A. FIG. 10C shows an example of a configuration, which covers the tip of the stator magnetic flux generator 3A provided across the second gap 12A with a magnetic body 13A.

As shown in FIG. 10A, the stator magnetic flux generator 3A in the magnetic drive apparatus 1A of the present invention is magnetized in the horizontal direction in the figure, and, furthermore, since the stator magnetic guidepaths 4An, 4As are separated by the second gap 12A, magnetic flux generated from the N pole from the bottom of the stator magnetic flux generator 3A is guided to the stator magnetic guidepath 4An, and magnetic flux from stator magnetic guidepath 4As is guided to the S pole from the bottom of the stator magnetic flux generator 3A. The second gap 12A between the stator magnetic guidepaths 4An, 4As is bridged in this way by the stator magnetic flux generator 3A.

In this constitution, since the stator magnetic flux generator 3A can be attached by being stacked on and brought into contact with the stator magnetic guidepaths 4An, 4As, there is no need for processing, which fabricates the dimensions of the stator magnetic flux generator 3A to coincide with the gap dimensions of the second gap 12A, or which fabricates the gap dimensions of the second gap 12A to coincide with the dimensions of the stator magnetic flux generator 3A.

Further, as shown in FIG. 10B, the constitution can also be such that two stator magnetic flux generators 3A of the same constitution, both magnetized in the horizontal direction in the figure, form bridges so as to sandwich the second gap 12A provided between the stator magnetic guidepaths 4An, 4As, and magnetic flux generated from the N pole is guided to the stator magnetic guidepath 4An, and magnetic flux of the stator magnetic guidepath 4As is guided to the S pole.

In the constitution shown in FIG. 10B, which is constituted like this, it is possible to generate two times the amount of magnetic flux as the constitution shown in FIG. 10A, thereby enabling the rotor magnetic flux generator 2A, which is not shown in the figure here, to be rotationally driven at a higher torque.

Furthermore, in the case of the constitutions shown in FIGS. 10A and 10B, the magnetic flux guided from the respective poles of the stator magnetic flux generator 3A to the stator magnetic guidepaths 4An, 4As mainly flows through the contact-making surfaces of the stator magnetic flux generator 3A and the stator magnetic guidepaths 4An, 4As, and most of the magnetic flux from other surfaces of the stator magnetic flux generator 3A becomes leakage flux that is not guided to the rotor 2A side. Accordingly, to guide the flow of magnetic flux more efficiently to the stator magnetic guidepaths 4An, 4As, the constitution can also be such that new members 13An, 13As are provided so as to cover the respective poles with a soft magnetic body the same as that of the stator magnetic guidepaths 4An, 4As shown in FIG. 10C, thereby reducing leakage flux, and increasing the effective magnetic flux to the rotor 2A.

Next, an example of a constitution for attaching magnetic flux controlling means 4Anr, 4Anl, 4Asu, 4Asd to stator magnetic guidepaths as bridges will be explained using FIG. 11 and giving magnetic flux controlling means 4Anr as an example. Furthermore, similar to above, since the other magnetic flux controlling means 4Anl, 4Asu, 4Asd are the same constitution as magnetic flux controlling means 4Anr, explanations of these other magnetic flux controlling means will be omitted here.

FIG. 11 is a diagram showing an example of a constitution, which uses magnetic flux controlling means 4Anr to bridge the space between the stator magnetic guidepath 4An and the magnetic pole tip 7Anr, via the first gap 8Anr provided partway along the stator magnetic guidepath 4An.

Figure 11A:
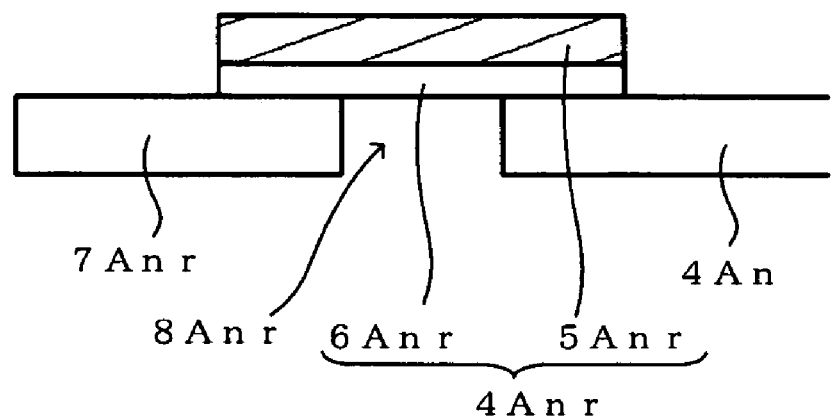
FIG. 11 is cross-sectional views showing examples of a constitution of a magnetic drive apparatus of the present invention (First Embodiment)
Figure 11B:
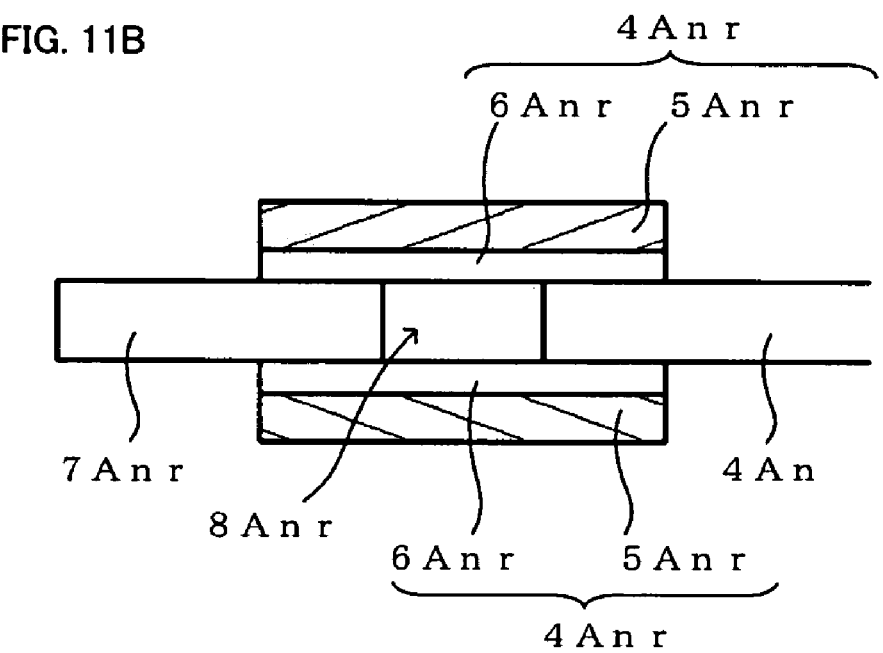

Furthermore, FIG. 11A shows an example of a constitution in which one magnetic flux controlling means 4Anr is arranged across this first gap 8Anr, and FIG. 11B shows an example of a constitution in which two magnetic flux controlling means 4Anr are arranged across the first gap 8Anr.

As shown in FIG. 11A, a magnetic flux controlling means 4Anr in a magnetic drive apparatus 1A of the present invention is constituted by adjoining and bonding a magnetostrictive material 6Anr and a piezoelectric material 5Anr. Bridging the first gap 8Anr using magnetic flux controlling means 4Anr is carried out by a constitution which causing the bottom surface of the magnetostrictive material 6Anr to make contact with the top surface of the end part of the stator magnetic guidepath 4An, and bringing the bottom surface of the magnetostrictive material 6Anr into contact with the end part of the stator magnetic guidepath 4An and the top surface of the magnetic pole tip 7Anr provided in a location that forms the first gap 8Anr. Forming this bridge enables magnetic flux from the stator magnetic guidepath 4An to be guided to the magnetic pole tip 7Anr via the magnetostrictive material 6Anr. Consequently, it is possible to bridge the first gap 8Anr provided between the stator magnetic guidepath 4An and the magnetic pole tip 7Anr using magnetic flux controlling means 4Anr.

Further, as shown in FIG. 11B, the constitution can also be such that a bridge is formed between the stator magnetic guidepath 4An and the magnetic pole tip 7Anr, by way of the first gap 8Anr disposed between the stator magnetic guidepath 4An and the magnetic pole tip 7Anr, from two sides using two magnetic flux controlling means 4Anr. In this constitution, too, the magnetic flux flowing through the stator magnetic guidepath 4An from the stator magnetic flux generator 3A is guided to the magnetic pole tip 7Anr through two magnetostrictive materials 6Anr, magnetically reconnecting same.

Thus, if the constitution shown in FIG. 11B is used, it becomes possible to more closely control the amount of flowing magnetic flux than in the constitution shown in FIG. 11A. Further, similar to the case of the stator magnetic flux generator 3A (refer to FIG. 10C), the constitution can also be such that leakage flux is reduced by providing a member, which covers both ends of the magnetostrictive material 6Anr using a soft magnetic material.

Next, examples of constitutions of the first gaps 8Anr, 8Anl, 8Asu, 8Asd in the magnetic drive apparatus 1A of the present invention will be explained. Furthermore, in the following explanation, first gap 8Anr will be given as an example, but since the constitutions of the other first gaps 8Anl, 8Asu, 8Asd are the same as that of this first gap 8Anr, explanations of the other first gaps will be omitted here.

FIG. 12 is a diagram showing an example of a constitution of a first gap 8Anr in the magnetic drive apparatus 1A of the present invention, and the bottom diagram in the respective diagrams shows a top planar view in the vicinity of the first gap 8Anr, and the top diagram shows a cross-sectional view thereof. Furthermore, FIGS. 12A, 12B show an example of a constitution, which provides an gap on the same plane (the mode shown above), FIGS. 12C, 12D show an example of a constitution, which arranges a non-magnetic material in the first gap 8Anr, and welds this non-magnetic material between the stator magnetic guidepath 4An and magnetic pole tip 7Anr, and FIGS. 12E, 12F show an example of a constitution, which provides a magnetic flux saturation part as the first gap 8Anr.

In the constitution shown in FIGS. 12C, 12D, if both the stator magnetic guidepath 4An and magnetic pole tip 7Anr are welded together in advance using a non-magnetic material as shown in the figure, the stator magnetic guidepath 4An and magnetic pole tip 7Anr can be treated as an integrated part. This will make it possible to reduce the assembly steps compared to the constitution of FIGS. 12A, 12B when mass producing the magnetic drive apparatus 1A.

Further, according to the constitution shown in FIGS. 12E, 12F, the ability to fabricate the stator magnetic guidepath 4An and magnetic pole tip 7Anr simultaneously makes it possible to reduce the number of components of the magnetic drive apparatus 1A. Further, since the positioning accuracy of the stator magnetic guidepath 4An and magnetic pole tip 7Anr is determined solely by fabrication precision, the respective members can be positioned with high precision more easily than the constitutions shown in FIGS. 12A through 12D. Thus, when there are a plurality of first gaps 8Anr, 8Anl, 8Asu, 8Asd as in this magnetic drive apparatus 1A, it is desirable that the irregularities between these respective first gaps 8Anr be capable of being reduced.

Furthermore, the constitutions from FIGS. 12A through 12F can also utilize either a first gap bridge in accordance with magnetic controlling means, or a second gap bridge in accordance with the stator magnetic flux generator 3A.

According to the above-described constitutions, it is possible to control the amount of magnetic flux flowing to the magnetic pole tips 7Anr, 7Anl, 7Asu, 7Asd, which are the destinations of the divided flow from the stator magnetic flux generator 3A, making it possible to constitute a driving apparatus that does not need an excitation coil in the magnetic drive apparatus 1A of the present invention. Consequently, power consumption can be reduced by lowering energy consumption resulting from the copper loss of the excitation coil and so forth. Further, the driving apparatus can be made smaller and thinner regardless of coil diameter. Further, effectively forming a magnetic circuit makes it possible to reduce the amount of leakage flux in the magnetic flux generated from the stator magnetic flux generator 3A, thereby increasing the amount of magnetic flux that contributes to driving the rotor magnetic flux generator 2A, and heightening driving efficiency.

Then, in the above-described constitutions, generally speaking, the stator magnetic flux generator 3A and magnetic flux controlling means 4Anr, 4Anl, 4Asu, 4Asd are arranged at a first gap and a second gap, which are the separated parts of the stator magnetic guidepaths 4An, 4As that are made from a soft magnetic material for which dimensional precision is difficult to achieve via processing, so as to form bridges, which are on different planes than the stator magnetic guidepaths 4An, 4As, and which form a magnetic connection across these first and second gaps, thereby doing away with the need to require strict dimensional precision for the stator magnetic flux generator 3A and magnetic flux controlling means 4Anr, 4Anl, 4Asu, 4Asd. Thus, fabrication and assembly costs can be kept low.

Further, according to the above-described constitutions, the first gaps 8Anr, 8Anl, 8Asu, 8Asd can be magnetically separated, making it possible to use a constitution, which reduces the number of parts, and facilitates the assembly of the magnetic drive apparatus.

Second Embodiment

Next, an example of another constitution of the magnetic drive apparatus of the present invention, and the operation thereof will be explained using FIGS. 13 through 15. This example of a constitution comprises two stator magnetic flux generators, and FIGS. 13 through 15 are a simplified diagram, operational diagram and oblique view for explaining another example of a constitution of the magnetic drive apparatus of the present invention.

Figure 13:
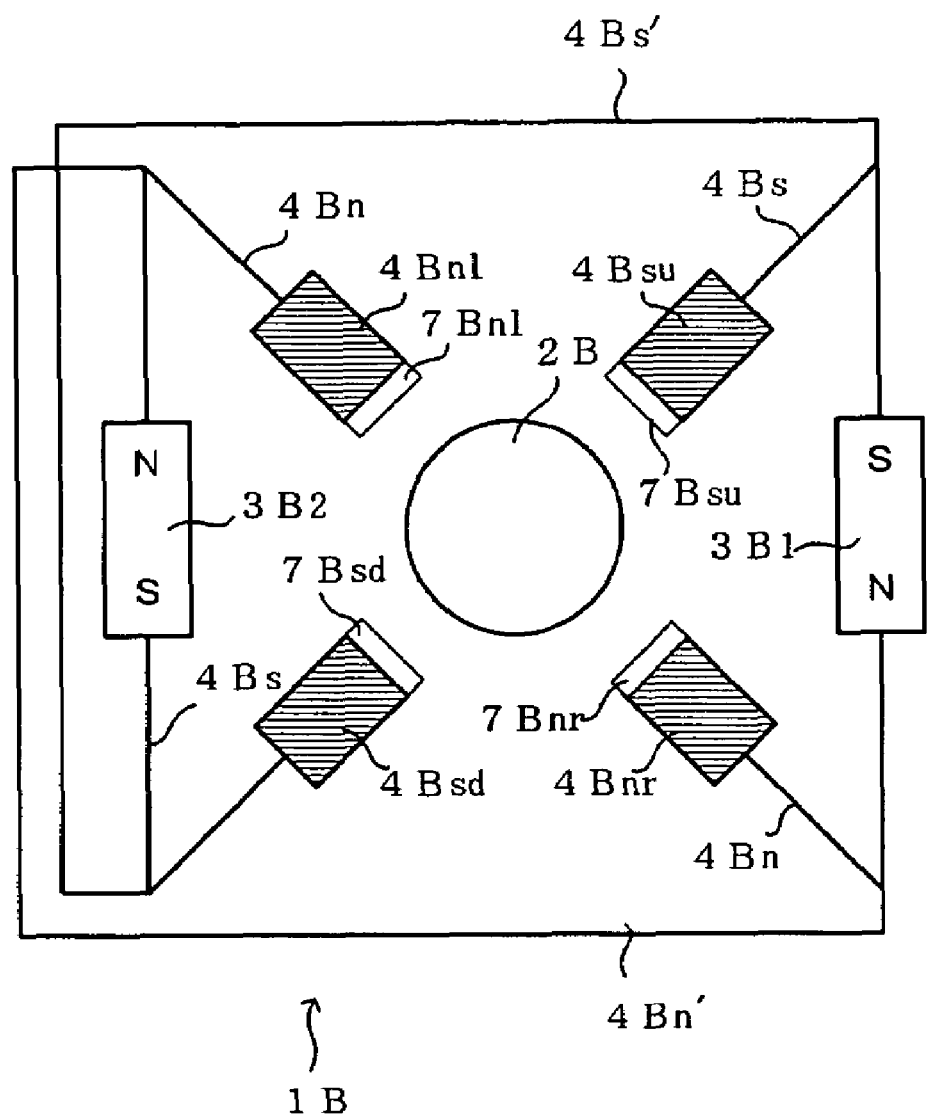
FIG. 13 is a simplified diagram for illustrating another example of a constitution of a magnetic drive apparatus of the present invention (Second Embodiment)
Figure 14A:
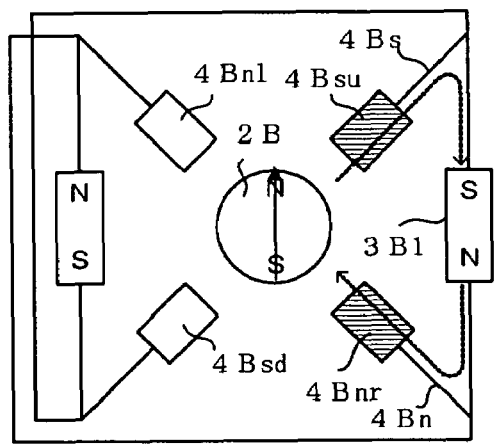
FIG. 14 is operational views for illustrating other examples of a constitution of a magnetic drive apparatus of the present invention (Second Embodiment)
Figure 14B:
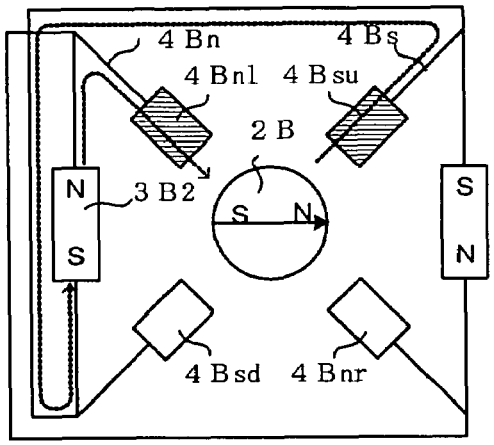
Figure 14C:
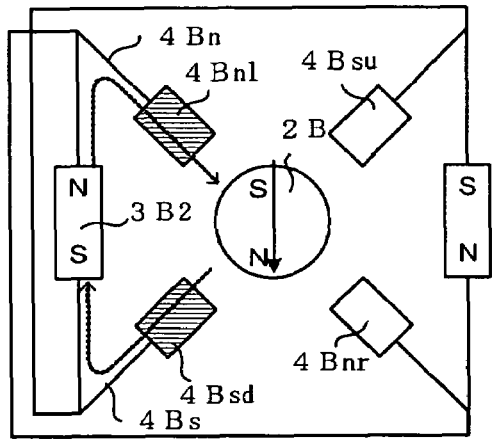
Figure 14D:
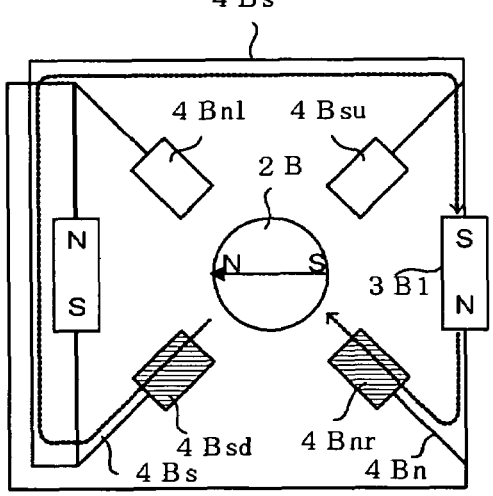
Figure 15:
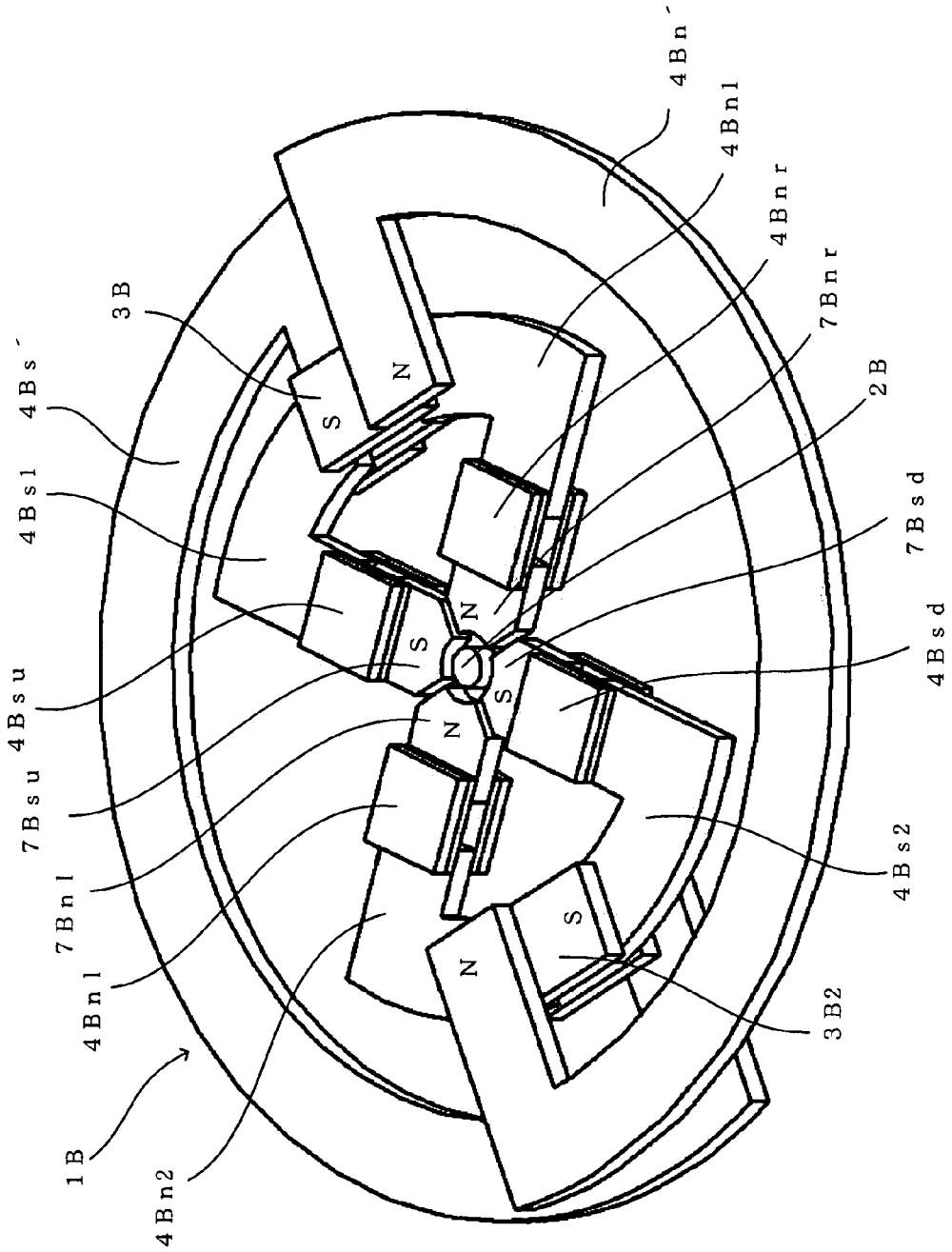
FIG. 15 is an oblique view showing another example of a constitution of a magnetic drive apparatus of the present invention (Second Embodiment)

As shown in FIGS. 13 through 15, a magnetic drive apparatus 1B of the present invention is constituted from a rotor and a stator, just like the magnetic drive apparatus 1A shown in the previous embodiment. Furthermore, a rotor magnetic flux generator 2B is shown as the rotor in this embodiment. In the following explanation, this rotor will be explained using the rotor magnetic flux generator 2B. This rotor magnetic flux generator 2B is subjected to an arbitrary rotational force based on an operating principle, which will be explained hereinbelow, making it possible to control rotation.

Further, the stator is constituted comprising a plurality (two in this embodiment) of stator magnetic flux generators 3B1, 3B2; stator magnetic guidepaths 4Bn, 4Bn', 4Bs, 4Bs', which divide the magnetic flux from the respective poles of the stator magnetic flux generators 3B1, 3B2 into a plurality of flows, and respectively guide same to the rotor magnetic flux generator 2B; magnetic pole tips 7Bnr, 7Bnl, 7Bsu, 7Bsd of single magnetic poles, which are provided at the ends of these stator magnetic guidepaths 4Bn, 4Bn', 4Bs, 4Bs', and which are magnetically separated and positioned at prescribed angular locations around the periphery of the rotor magnetic flux generator 2B; and magnetic flux controlling means 4Bnr, 4Bnl, 4Bsu, 4Bsd. The same as in the first embodiment, the stator is constituted comprising first gaps, which are provided partway along the respective stator magnetic guidepaths 4Bn, 4Bn', 4Bs, 4Bs' and magnetically separate same on the same plane; and magnetic flux controlling means 4Bnr, 4Bnl, 4Bsu, 4Bsd, which are arranged on a different plane than these respective first gaps, and which magnetically reconnect the respective stator magnetic guidepaths by forming bridges across these first gaps on a different plane than the stator magnetic guidepaths.

Further, although not shown in this figure, these magnetic pole tips 4Bnr, 4Bnl, 4Bsu, 4Bsd are comprised from magnetostrictive materials, which constitute magnetic paths along which magnetic flux flows, and the magnetic characteristics of which can be changed by applying stress, and piezoelectric materials, which adjoin and apply stress to the respective magnetostrictive materials the same as in the first embodiment. Since this constitution is the same as that of the first embodiment, a detailed explanation will be omitted here.

The magnetic drive apparatus 1B, which is constituted like this, controls the flow of magnetic flux to the magnetic pole tips 7Bnr, 7Bnl, 7Bsu, 7Bsd, switches the strong/weak balance of the respective positive and negative magnetic poles, which is manifested at the respective magnetic pole tips, and switches the positive/negative strong/weak balance by controlling the magnetic characteristics of the respective stator magnetic guidepaths 4Bn, 4Bn', 4Bs, 4Bs' using magnetic flux controlling means 4Bnr, 4Bnl, 4Bsu, 4Bs.

As a result, the direction of the magnetic flux flowing between the respective magnetic pole tips 7Bnr, 7Bnl, 7Bsu, 7Bsd can be effectively switched relative to the rotor magnetic flux generator 2B, and a driving force for rotationally driving the rotor magnetic flux generator 2B, which is positioned between the magnetic pole tips, can be made to function.

Furthermore, since the respective STEPs for rotationally driving the rotor magnetic flux generator 2B are the same as in the first embodiment, a detailed explanation of same will be omitted here, but as shown in FIGS. 14A through 14D, the flow of magnetic flux to the magnetic pole tips 7Bnr, 7Bnl, 7Bsu, 7Bsd is controlled by controlling magnetic flux controlling means 4Bnr, 4Bnl, 4Bsu, 4Bsd.

FIG. 14A shows a control state for increasing the amount of magnetic flux to the magnetic pole tips 7Bnr, 7Bsu by controlling magnetic flux controlling means 4Bnl, 4Bsd to reduce the amount of magnetic flux, FIG. 14B shows a control state for increasing the amount of magnetic flux to the magnetic pole tips 7Bnl, 7Bsu by controlling magnetic flux controlling means 4Bnr, 4Bsd to reduce the amount of magnetic flux, FIG. 14C shows a control state for increasing the amount of magnetic flux to the magnetic pole tips 7Bnl, 7Bsd by controlling magnetic flux controlling means 4Bnr, 4Bsu to reduce the amount of magnetic flux, and FIG. 14D shows a control state for increasing the amount of magnetic flux to the magnetic pole tips 7Bnr, 7Bsd by controlling magnetic flux controlling means 4Bnl, 4Bsu to reduce the amount of magnetic flux. The rotor magnetic flux generator 2B rotates in accordance with these revolving magnetic flux states.

Furthermore, in the steps of FIGS. 14B and 14D, the rotor magnetic flux generator 2B can be rotated to the next step by inertial force, and when this inertial force is utilized, driving is possible without using the stator magnetic guidepaths 4Bn' and 4Bs'.

Further, by using a constitution, which connects the same poles of the two stator magnetic flux generators, it is possible to alleviate deviations in magnetic force balance resulting from irregularities in the magnetic forces from the respective stator magnetic flux generators.

Thus, the magnetic drive apparatus 1B of the present invention has two stator magnetic flux generators, but the same as the first embodiment, can constitute a driving apparatus that does not need an excitation coil as in a conventional constitution. Further, eliminating the need for an excitation coil in this apparatus makes it possible to reduce power consumption by lowering energy consumption due to the copper loss of an excitation coil and so forth. Further, doing away with the need for an excitation coil enables the driving apparatus to be made smaller and thinner regardless of coil diameter. Further, since a magnetic circuit is effectively formed, it is possible to reduce the amount of leakage flux in the magnetic flux generated from the stator magnetic flux generator 3B, and to increase the amount of magnetic flux that contributes to driving the rotor magnetic flux generator 2B, thereby heightening driving efficiency. Further, because this constitution connects the same poles of the two stator magnetic flux generators, the magnetic force balance of the respective stator magnetic flux generators can easily be made to coincide.

Figure 20:
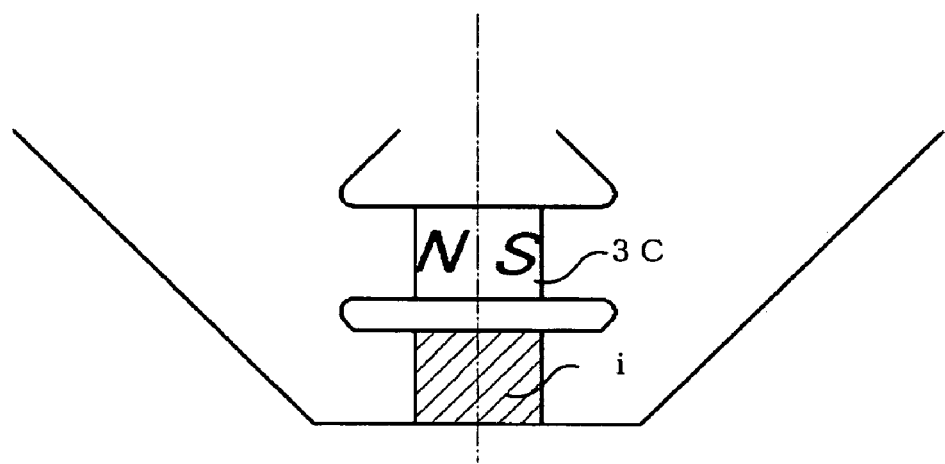
FIG. 20 is a diagram showing an example of the second constitution comprising four stator magnetic flux generators of a magnetic drive apparatus of the present invention (Fourth Embodiment)
Figure 21:
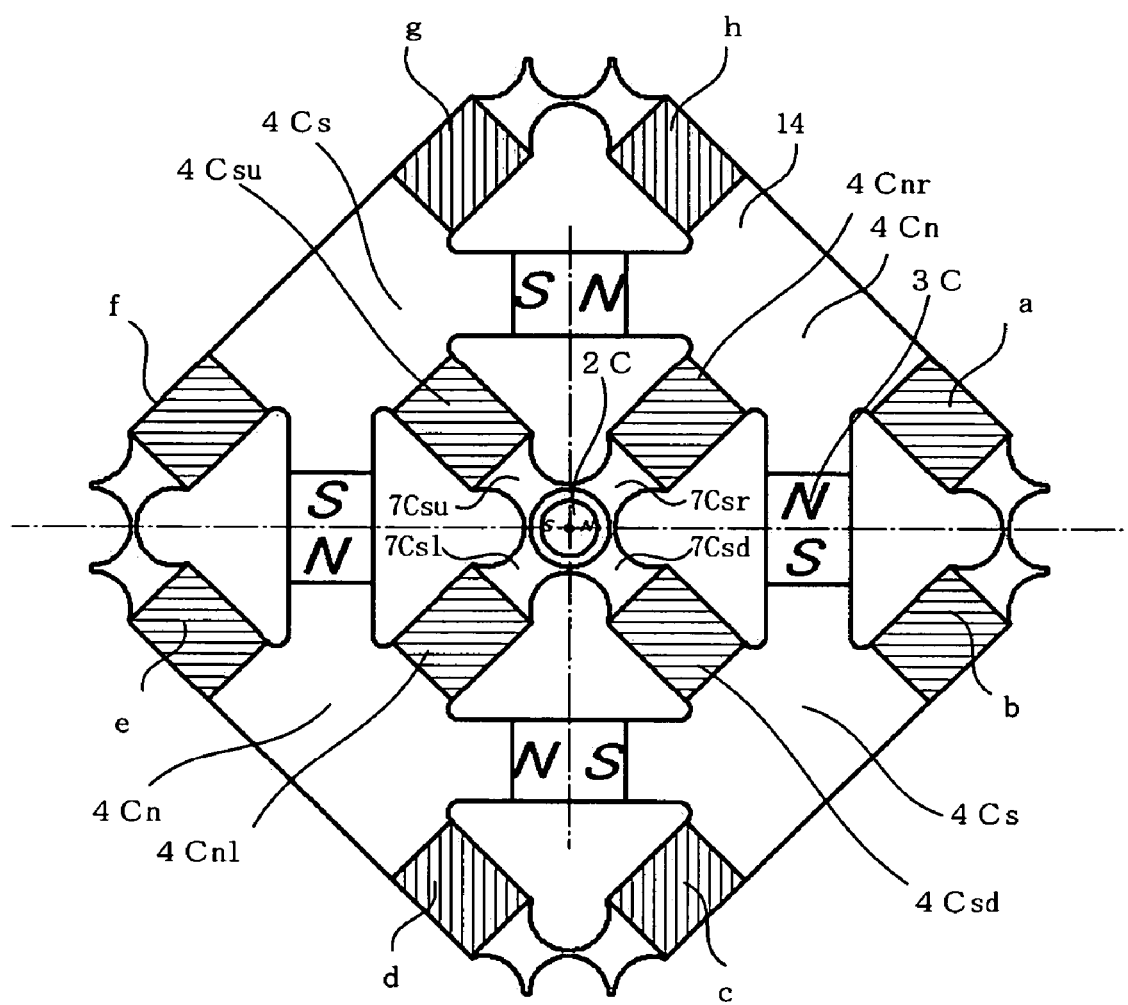
FIG. 21 is a diagram showing an example of a third constitution comprising four stator magnetic flux generators of a magnetic drive apparatus of the present invention (Fifth Embodiment)
Figure 22:
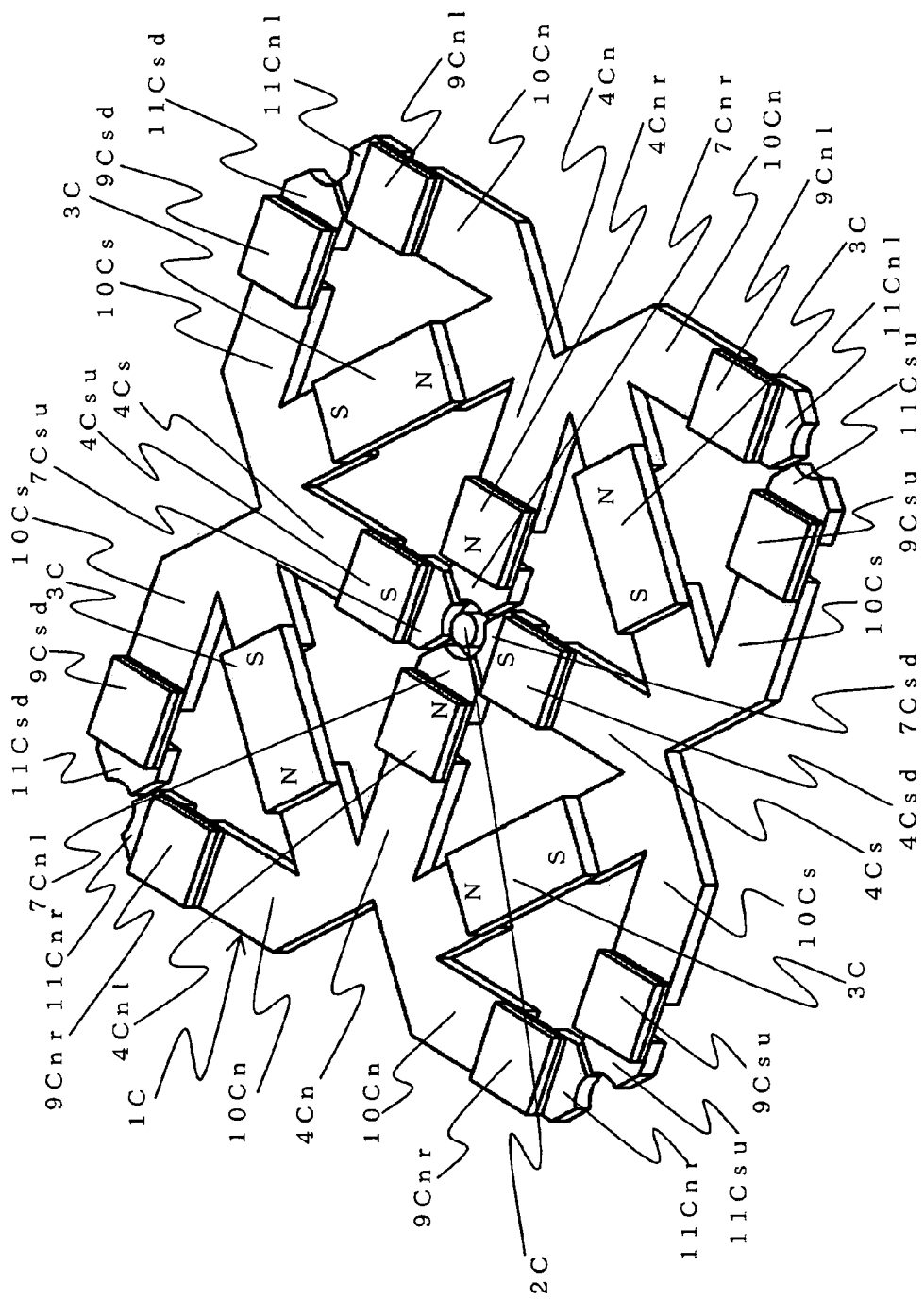
FIG. 22 is an oblique view showing an example of the third constitution comprising four stator magnetic flux generators of a magnetic drive apparatus of the present invention (Fifth Embodiment)

Next, an example of a constitution having four stator magnetic flux generators will be explained using FIGS. 16 through 22. Furthermore, FIGS. 16 and 17 show a first example of a constitution having four stator magnetic flux generators, FIGS. 18 through 20 show a second example of a constitution having four stator magnetic flux generators, and FIGS. 21 and 22 show a third example of a constitution having four stator magnetic flux generators.

Third Embodiment

Figure 16:
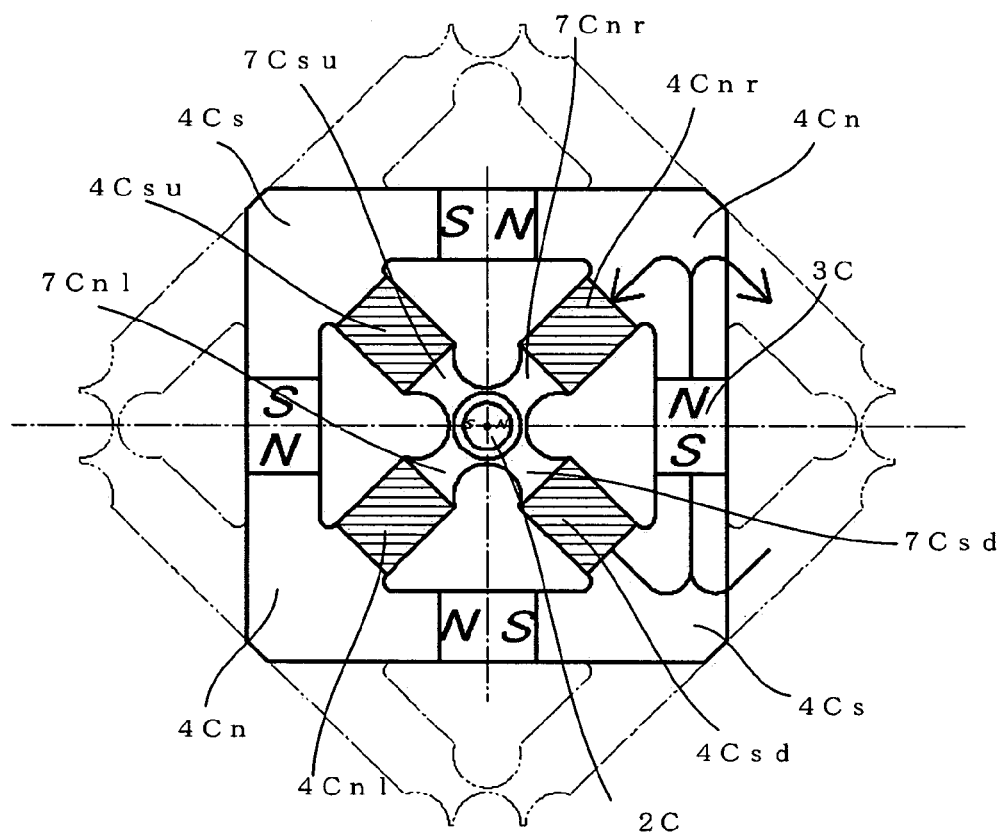
FIG. 16 is a diagram showing an example of a first constitution comprising four stator magnetic flux generators of a magnetic drive apparatus of the present invention (Third Embodiment)

A first example of a constitution having four stator magnetic flux generators, as shown in FIG. 16, comprises four stator magnetic flux generators 3C arranged having the same poles facing one another; and four stator magnetic guidepaths 4Cn, 4Cs, 4Cn, 4Cs, which connect these stator magnetic flux generators 3C to form a principal magnetic path, and magnetic flux controlling means 4Cnr, 4Cnl, 4Csu, 4Csd are arranged in the respective stator magnetic guidepaths 4Cn, 4Cs, 4Cn, 4Cs partway along the principal magnetic path to the rotor magnetic flux generator 2C.

According to this constitution, the magnetic drive apparatus can be made smaller. Further, the stator magnetic guidepaths and stator magnetic flux generators can be used to fasten the outside of the magnetic drive apparatus.

According to the first example of a constitution, controlling magnetic flux controlling means 4Cnr, 4Cnl, 4Csu, 4Csd makes it possible to effectively switch the direction of the magnetic flux flowing between the respective magnetic pole tips 7Cnr, 7Cnl, 7Csu, 7Csd relative to the rotor magnetic flux generator 2C, and to cause a driving force for rotationally driving the rotor magnetic flux generator 2C, which is positioned between the magnetic pole tips, to function.

Furthermore, since the respective STEPs for rotationally driving the rotor magnetic flux generator 2C are the same as in the first embodiment, a detailed explanation of same will be omitted here, but as shown in FIGS. 17A through 17D, the flow of magnetic flux to the magnetic pole tips 7Cnr, 7Cnl, 7Csu, 7Csd is controlled by controlling magnetic flux controlling means 4Cnr, 4Cnl, 4Csu, 4Csd.

Figure 17A:
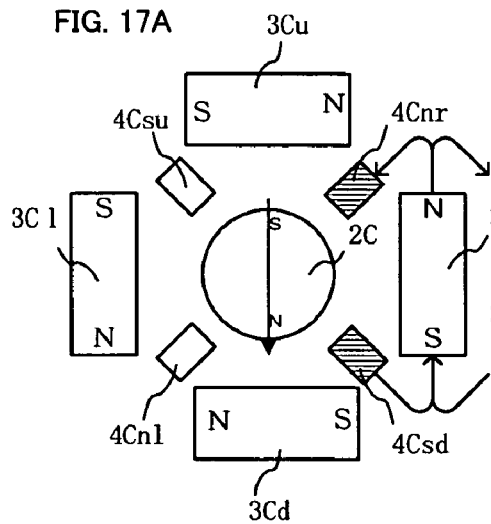
FIG. 17 is operational views of an example of the first constitution comprising four stator magnetic flux generators of a magnetic drive apparatus of the present invention (Third Embodiment)
Figure 17B:
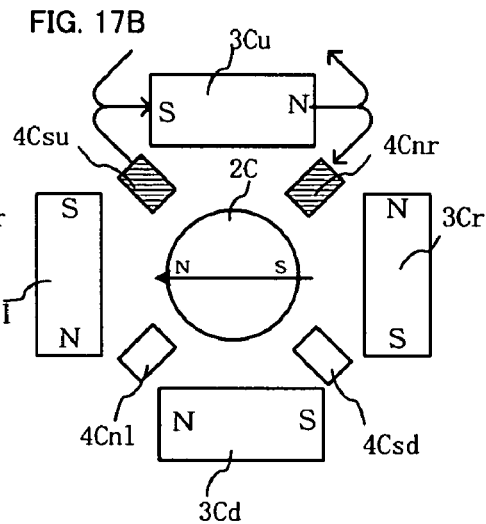
Figure 17C:
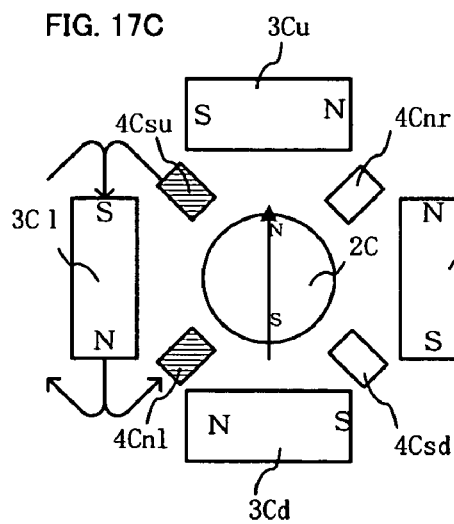
Figure 17D:
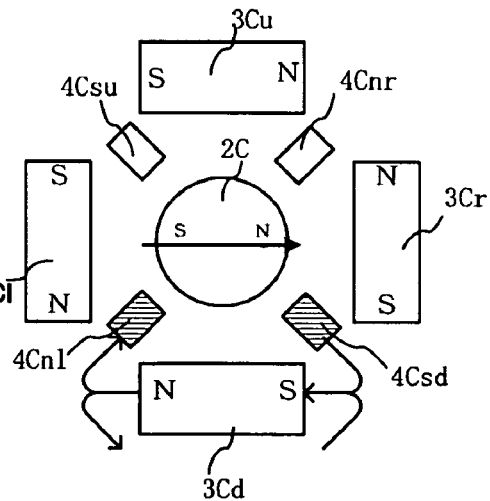
Figure 18:
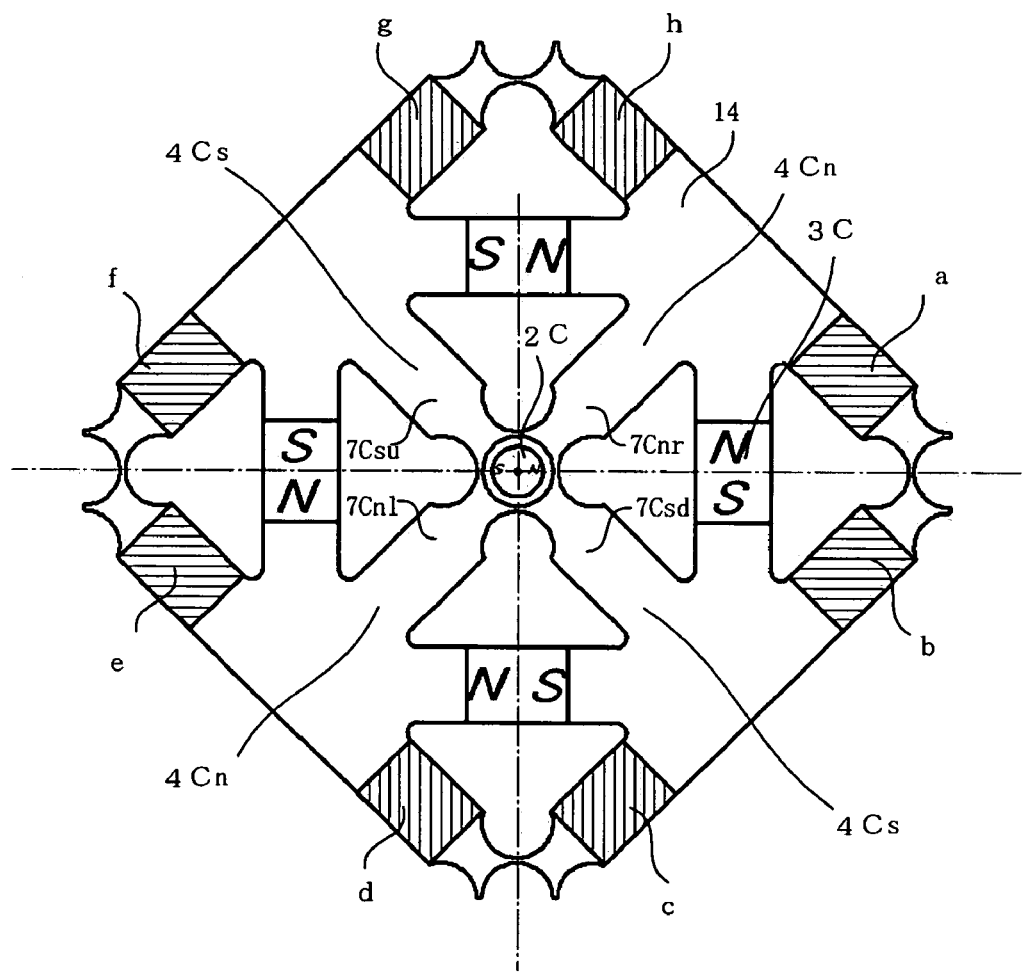
FIG. 18 is a diagram showing an example of a second constitution comprising four stator magnetic flux generators of a magnetic drive apparatus of the present invention (Fourth Embodiment)

FIG. 17A shows a control state for increasing the amount of magnetic flux to the magnetic pole tips 7Cnr, 7Csd by controlling magnetic flux controlling means 4Cnl, 4Csu to reduce the amount of magnetic flux, FIG. 17B shows a control state for increasing the amount of magnetic flux to the magnetic pole tips 7Cnr, 7Csu by controlling magnetic flux controlling means 4Cnl, 4Csd to reduce the amount of magnetic flux, FIG. 17C shows a control state for increasing the amount of magnetic flux to the magnetic pole tips 7Cnl, 7Csu by controlling magnetic flux controlling means 4Cnr, 4Csd to reduce the amount of magnetic flux, and FIG. 17D shows a control state for increasing the amount of magnetic flux to the magnetic pole tips 7Cnl, 7Csd by controlling magnetic flux controlling means 4Cnr, 4Csu to reduce the amount of magnetic flux. The rotor magnetic flux generator 2C rotates in accordance with these revolving magnetic flux states.

Fourth Embodiment

A second example of a constitution having four stator magnetic flux generators, as shown in FIG. 18, comprises four stator magnetic flux generators 3C arranged having the same poles facing one another; and four stator magnetic guidepaths 4Cn, 4Cs, 4Cn, 4Cs, which connect these stator magnetic flux generators 3C to form a principal magnetic path, and a stator magnetic guidepath 14, which forms a leakage magnetic path, and magnetic flux controlling means a through h are arranged partway along the leakage magnetic path of the respective stator magnetic guidepaths 14.

According to this constitution, magnetic flux controlling means a through h can easily be wired from the peripheral part. Further, the stator magnetic guidepaths and stator magnetic flux generators can be used to fasten the inside of the magnetic drive apparatus.

According to the second example of a constitution, controlling magnetic flux controlling means a through h makes it possible to effectively switch the direction of the magnetic flux flowing between the respective magnetic pole tips 7Cnr, 7Cnl, 7Csu, 7Csd relative to the rotor magnetic flux generator 2C, and to cause a driving force for rotationally driving the rotor magnetic flux generator 2C, which is positioned between the magnetic pole tips, to function.

Furthermore, since the respective STEPs for rotationally driving the rotor magnetic flux generator 2C are the same as in the first embodiment, a detailed explanation of same will be omitted here, but as shown in FIGS. 19A through 19D, the flow of magnetic flux to the magnetic pole tips 7Cnr, 7Cnl, 7Csu, 7Csd is controlled by controlling magnetic flux controlling means a through h.

FIG. 19A shows a control state for increasing the amount of magnetic flux to the magnetic pole tips 7Cnr, 7Csd by controlling magnetic flux controlling means a, b to reduce the amount of magnetic flux, FIG. 19B shows a control state for increasing the amount of magnetic flux to the magnetic pole tips 7Cnr, 7Csu by controlling magnetic flux controlling means g, h to reduce the amount of magnetic flux, FIG. 19C shows a control state for increasing the amount of magnetic flux to the magnetic pole tips 7Cnl, 7Csu by controlling magnetic flux controlling means e, f to reduce the amount of magnetic flux, and FIG. 19D shows a control state for increasing the amount of magnetic flux to the magnetic pole tips 7Cnl, 7Csd by controlling magnetic flux controlling means c, d to reduce the amount of magnetic flux. The rotor magnetic flux generator 2C rotates in accordance with these revolving magnetic flux states.

Furthermore, in addition to the arrangement shown in FIG. 18, magnetic flux controlling means arranged in the leakage magnetic path can also be arranged as shown in FIG. 20. The constitution of FIG. 20 can be formed using one magnetic flux controlling means i for the stator magnetic flux generator 3C. According to this constitution, the number of magnetic flux controlling means can be cut in half compared to the constitutional arrangement of FIG. 18.

Fifth Embodiment

A third example of a constitution having four stator magnetic flux generators, as shown in FIGS. 21 and 22, is an example of a constitution that combines the first and second constitution examples, and comprises four stator magnetic flux generators 3C arranged having the same poles facing one another; and four stator magnetic guidepaths 4Cn, 4Cs, 4Cn, 4Cs, which connect these stator magnetic flux generators 3C to form a principal magnetic path, and a stator magnetic guidepath 14, which forms a leakage magnetic path, magnetic flux controlling means 4Cnr, 4Cnl, 4Csu, 4Csd are arranged in the respective stator magnetic guidepaths 4Cn, 4Cs, 4Cn, 4Cs partway along the principal magnetic path to the rotor magnetic flux generator 2C, and magnetic flux controlling means a through h are arranged partway along the leakage magnetic path of the respective stator magnetic guidepaths 14.

According to the third example of the constitution, controlling magnetic flux controlling means 4Cnr, 4Cnl, 4Csu, 4Csd makes it possible to effectively switch the direction of the magnetic flux flowing between the respective magnetic pole tips 7Cnr, 7Cnl, 7Csu, 7Csd relative to the rotor magnetic flux generator 2C, and to cause a driving force for rotationally driving the rotor magnetic flux generator 2C, which is positioned between the magnetic pole tips, to function, and further, controlling magnetic flux controlling means a through h makes it possible to control the flow of magnetic flux to the magnetic pole tips 7Cnr, 7Cnl, 7Csu, 7Csd, and to adjust the magnetic force balance of the respective poles on the stator side.

FIG. 22 is an oblique view showing an example of a constitution of a magnetic drive apparatus 1C of the present invention. The magnetic drive apparatus 1C of the present invention shown here is one in which a plurality of stator magnetic flux generators 3C (four in this embodiment) are provided, the same as in the second embodiment.

As shown in FIG. 22, the magnetic drive apparatus 1C of the present invention is constituted from a rotor and a stator, the same as in the above embodiments. Furthermore, it shows a rotor magnetic flux generator 2C as the rotor in this embodiment. In the following explanation, this rotor will be explained using the rotor magnetic flux generator 2C. This rotor magnetic flux generator 2C is subjected to an arbitrary rotational force based on an operating principle, which will be explained hereinbelow, making it possible to control rotation.

Further, the stator comprises four stator magnetic flux generators 3C; stator magnetic guidepaths 4Cn, 4Cs, which divide the magnetic flux from the respective poles of the stator magnetic flux generators 3C into a plurality of flows, and respectively guide same to the rotor magnetic flux generator 2C, and adjustment magnetic guidepaths 10Cn, 10Cs, which do not guide magnetic flux to another rotor magnetic flux generator 2C; magnetic pole tips 7Cnr, 7Cnl, 7Csu, 7Csd of single magnetic poles, which are provided at the ends of the stator magnetic guidepaths 4Cn, 4Cs, and which are magnetically separated and positioned at prescribed angular locations around the periphery of the rotor magnetic flux generator 2C; and adjustment magnetic pole tips 11Cnr, 11Cnl, 11Csu, 11Csd, which are provided at the ends of the respective adjustment magnetic guidepaths 10Cn, 10Cs.

Further, the same as in the first embodiment, this stator comprises first gaps, which are provided partway along the respective stator magnetic guidepaths 4Cn, 4Cs and magnetically separate same on the same plane; and magnetic flux controlling means 4Cnr, 4Cnl, 4Csu, 4Csd, which are arranged on a different plane than these respective first gaps, and which magnetically reconnect the respective stator magnetic guidepaths by forming bridges across these first gaps on a different plane than the stator magnetic guidepaths.

Further, the stator in this constitution is constituted comprising first gaps, which are disposed partway along the respective adjustment magnetic guidepaths 10Cn, 10Cs and magnetically separate same on the same plane; and adjustment magnetic flux controlling means 9Cnr, 9Cnl, 9Csu, 9Csd, which are arranged on a different plane than these respective first gaps, and which magnetically reconnect the respective stator magnetic guidepaths 4Cn, 4Cs by forming bridges across these first gaps on a different plane than the stator magnetic guidepaths 4Cn, 4Cs.

The constitution is such that the stator magnetic guidepaths 4Cn, 4Cs, adjustment magnetic guidepaths 10Cn, 10Cs, magnetic pole tips 7Cnr, 7Cnl, 7Csu, 7Csd, and adjustment magnetic pole tips 11Cnr, 11Cnl, 11Csu, 11Csd are arranged on the same plane, and the plurality of stator magnetic flux generators 3C, magnetic flux controlling means 4Cnr, 4Cnl, 4Csu, 4Csd, and adjustment magnetic flux controlling means 9Cnr, 9Cnl, 9Csu, 9Csd are arranged on the same plane. Furthermore, the adjustment magnetic flux controlling means 9Cnr, 9Cnl, 9Csu, 9Csd of FIG. 22 correspond to the magnetic flux controlling means a through h in FIG. 21.

Further, although not shown in this figure, these magnetic flux controlling means 4Cnr, 4Cnl, 4Csu, 4Csd, and adjustment magnetic flux controlling means 9Cnr, 9Cnl, 9Csu, 9Csd are constituted from magnetostrictive materials, which constitute magnetic paths along which magnetic flux flows, and which can change their magnetic characteristics by being subjected to stress, and piezoelectric materials, which adjoin and apply stress to the respective magnetostrictive materials the same as in the first embodiment. Since this constitution is the same as that of the first embodiment, a detailed explanation will be omitted here.

The magnetic drive apparatus 1C, which is constituted like this, controls the flow of the magnetic flux to the magnetic pole tips 7Cnr, 7Cnl, 7Csu, 7Csd, switches the strong/weak balance of the respective positive and negative magnetic poles, which is manifested in the magnetic pole tips, and switches the positive/negative strong/weak balance by controlling the magnetic characteristics of the respective stator magnetic guidepaths 4Cn, 4Cs using magnetic flux controlling means 4Cnr, 4Cnl, 4Csu, 4Csd. As a result, the direction of the magnetic flux flowing between the respective magnetic pole tips 7Cnr, 7Cnl, 7Csu, 7Csd is effectively switched relative to the rotor magnetic flux generator 2C, and a driving force for rotationally driving the rotor magnetic flux generator 2C, which is positioned between the magnetic pole tips, can be made to function.

Furthermore, if adjustment magnetic flux controlling means 9Cnr, 9Cnl, 9Csu, 9Csd are respectively made correspondent and simultaneously driven with magnetic flux controlling means 4Cnr, 4Cnl, 4Csu, 4Csd, the respective STEPs for rotationally driving the rotor magnetic flux generator 2C are the same as in the first embodiment, and therefore an explanation of same will be omitted here.

However, for the magnetic drive apparatus 1C, which is constituted like this, there are cases in which irregularities in the amount of magnetic flux that is generated from the respective plurality of stator magnetic flux generators 3C occur during the manufacturing process. For example, when the constitution is such that the amount of magnetic flux generated from the stator magnetic flux generator 3C at the left side of the figure is constantly less than the amount of magnetic flux generated by the other stator magnetic flux generators 3C at the top, right and bottom of the figure, if left as-is, the amount of magnetic flux flowing from the left-side stator magnetic flux generator 3C to the stator magnetic guidepaths 4Cn, 4Cs decreases, and can cause irregularities in the magnetic field acting on the rotor magnetic flux generator 2C, making rotational drive difficult.

Accordingly, a piezoelectric material, which is not shown in FIG. 12, is more extensively displaced and driven so that the adjustment magnetic flux generators 9Cnr, 9Csu on the same side as the stator magnetic flux generator 3C of the left side can be controlled from an adjustment magnetic flux controlling means in another location to generate a larger amount of magnetic flux. By so doing, the amount of magnetic flux flowing from the left-side stator magnetic flux generator 3C to the stator magnetic guidepaths 4Cn, 4Cs can be increased, thereby reducing the irregularities in the magnetic field acting on the rotor magnetic flux generator 2C, and making possible driving that is the same as that in the first embodiment.

Thus, the magnetic drive apparatus 1C of the present invention has four stator magnetic flux generators 3C, and the same as in the first embodiment, can constitute a driving apparatus that does not need an excitation coil as in a conventional constitution. Further, eliminating the need for an excitation coil in this apparatus enables power consumption to be reduced by lowering energy consumption due to the copper loss of an excitation coil and so forth. Further, doing away with the need for an excitation coil enables the driving apparatus to be made smaller and thinner regardless of coil diameter. Further, since a magnetic circuit is effectively formed, it is possible to reduce the amount of leakage flux in the magnetic flux generated from the stator magnetic flux generators 3C, and to increase the amount of magnetic flux that contributes to driving the rotor magnetic flux generator 2C, thereby heightening driving efficiency.

Further, in this mode, since the entire driving apparatus is constituted planarly, the present invention can be made even thinner than the constitutions shown in the first and second embodiments. Further, in this mode, it is possible to reduce an irregularity in the amount of magnetic flux generated from a stator magnetic flux generator 3C due to a manufacturing process by driving adjustment magnetic flux controlling means 9Cnr, 9Cnl, 9Csu, 9Csd.

Next, examples of constitutions of a rotor will be explained using FIGS. 23 through 25. The rotor constitution can be made from a magnet, a soft magnetic material having a salient pole, and a magnet and a salient-pole soft magnetic material.

Figure 23:
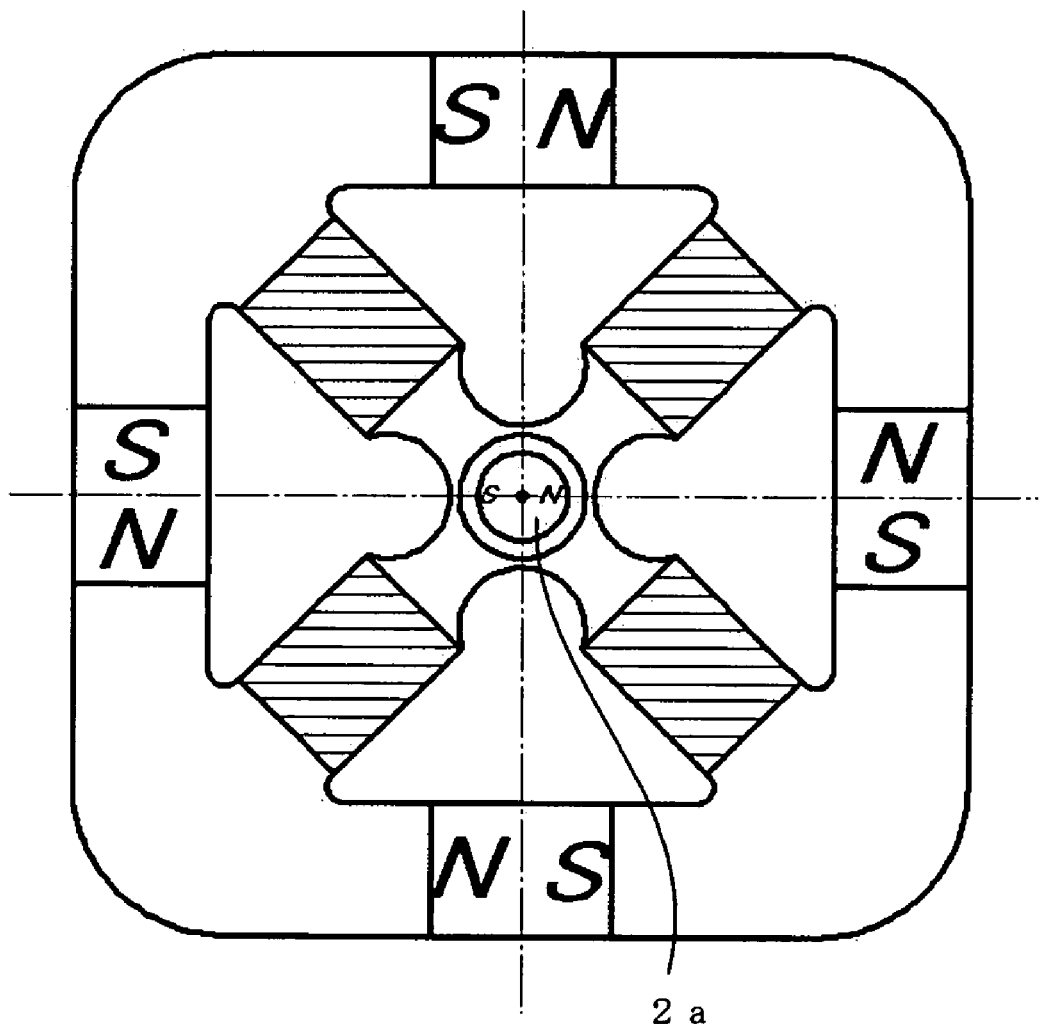
FIG. 23 is a diagram for illustrating an example of a constitution of the rotor of a magnetic drive apparatus of the present invention.

FIG. 23 shows a rotor 2a, which is made from a magnet. The torque T achieved via this constitution is magnetic torque, and is expressed as the product of a magnetic field H by a stator magnetic flux generator, and the magnetization M of the rotor and magnet (T=M*H). Further, in this constitution, there is no holding torque.

Figure 24:
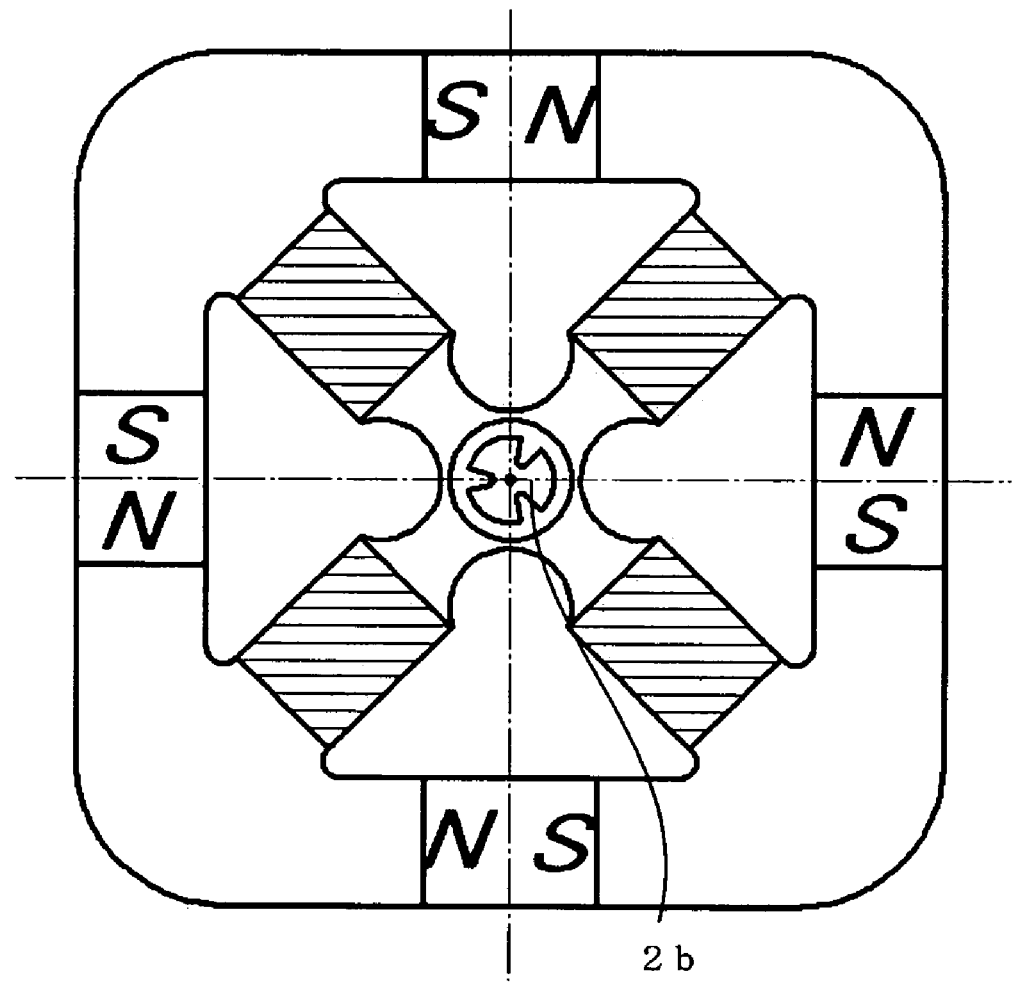
FIG. 24 is a diagram for illustrating an example of a constitution of the rotor of a magnetic drive apparatus of the present invention.

FIG. 24 shows a rotor 2b, which is made from a soft magnetic material having salient poles. The torque T achieved by this rotor configuration comprising a salient-pole soft magnetic material is reluctance torque, and is expressed as T=(½)*F2*(dR/dθ). Furthermore, as used here, F is magnetic flux, R is magnetic resistance, and θ is the angle of rotation.

According to this salient-pole soft magnetic material rotor constitution, since the rotor 2b can be formed by simply using an iron core, the process for incorporating a magnet can be done away with, enabling cost to be lowered. Holding torque can be achieved via the protrusions, and the protrusions of rotor 2b can also be constituted to serve as a gear.

Figure 25A:
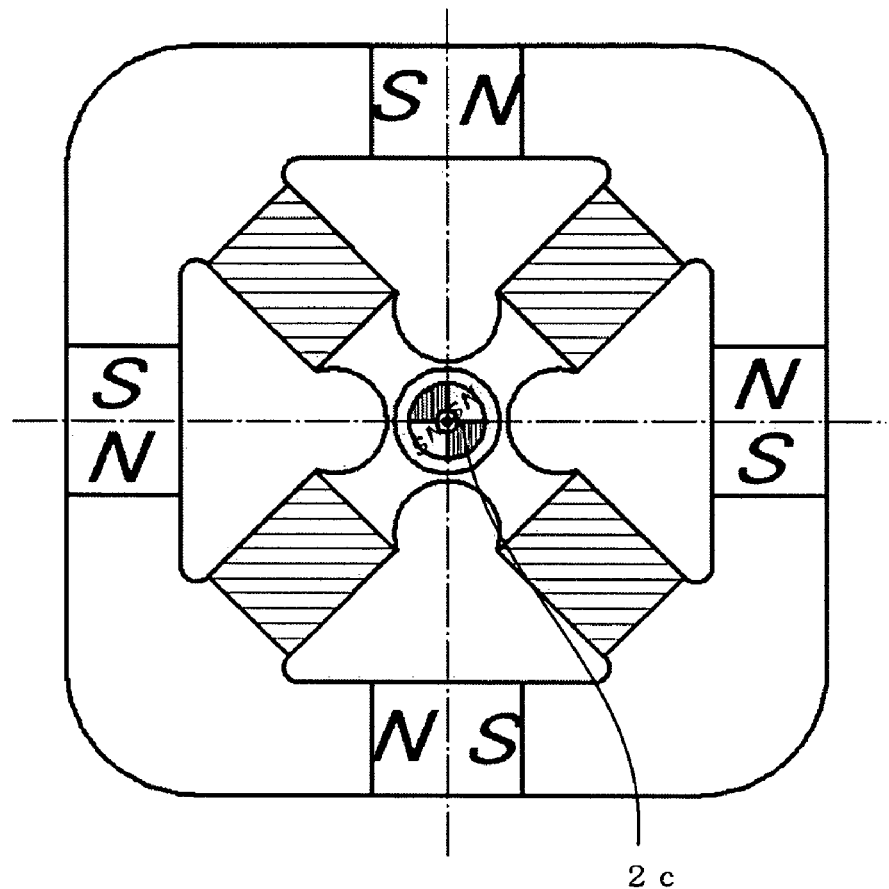
FIG. 25 is diagrams for illustrating examples of constitutions of the rotor of a magnetic drive apparatus of the present invention.
Figure 25B:
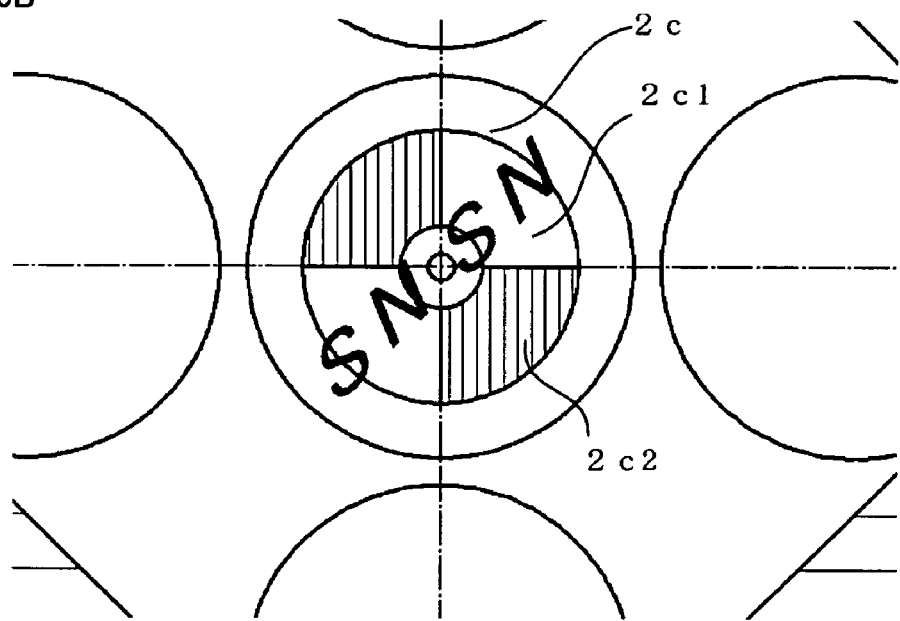

The rotor 2c shown in FIG. 25 is a constitution, which combines rotor 2a of FIG. 23, which is made from a magnet, and rotor 2b of FIG. 24, which comprises a salient-pole soft magnetic material. Furthermore, FIG. 25B shows the rotor 2c alone, comprising a magnet part 2c1 and a soft magnetic material part 2c2.

According to this constitution, the driving apparatus has both magnetic torque and reluctance torque, and can also be furnished with holding torque.

Next, a second mode for parallelly connecting magnetic flux controlling means to a stator magnetic guidepath will be explained using FIGS. 26 through 32.

First, an example of a constitution of the second mode in which a magnetic path is formed on an axial inner surface will be explained using FIGS. 26 through 28.

Sixth Embodiment

FIG. 26 shows a cross-sectional portion in the axial direction of a rotor 2d for a magnetic drive apparatus. Furthermore, only one part of the stator side is shown here.

In FIG. 26, a stator magnetic flux generator 3D is arranged on the stator side in the same direction as the axial direction of the rotor 2d, stator magnetic guidepaths 4Du and 4Dd are provided at both magnetic pole tips of this stator magnetic flux generator 3D, the ends of the stator magnetic guidepaths 4Du and 4Dd protrude toward the side of the rotor 2d, and these protruding parts constitute the magnetic pole tips.

Furthermore, magnetic flux controlling means 4Dns is provided between the two magnetic tips of the stator magnetic flux generator 3D. A magnetic path that passes through this magnetic flux controlling means 4Dns, and the magnetic path that passes through the stator magnetic guidepath 4Du, the rotor 2d, and the stator magnetic guidepath 4Dd are parallelly connected relative to the stator magnetic flux generator 3D. The one magnetic flux, of the magnetic flux that is generated from the N pole of the stator magnetic flux generator 3D, follows a magnetic path, which passes through the stator magnetic guidepath 4Du, the rotor 2d, and the stator magnetic guidepath 4Dd and returns to the S pole of the stator magnetic flux generator 3D, and the other magnetic flux follows a magnetic path, which passes through the magnetic flux controlling means 4Dns, and returns to the S pole of the stator magnetic flux generator 3D. The amount of magnetic flux of the magnetic flux, which passes through these two magnetic paths, is allocated based on the magnetic resistance of the respective magnetic paths.

Here, magnetic flux controlling means 4Dns is constituted by stacking and bonding a piezoelectric material 5D and a magnetostrictive material 6D similar to the respective examples of constitutions of the above-described mode. The piezoelectric material 5D is made from a material that can be displaced by applying an electric field, and compressively displacing this piezoelectric material 5D applies compressive stress to the adjoining magnetostrictive material 6D. Upon being subjected to compressive stress, the magnetic permeability of the magnetostrictive material 6D changes by virtue of the reverse magnetostrictive effect.

Magnetic flux controlling means 4Dns is partially attached to the stator magnetic flux generator 3D on the stator side, but is not attached to the stator magnetic guidepath 4Du and the stator magnetic guidepath 4Dd. Therefore, magnetic flux controlling means 4Dns simply comes in contact with the stator magnetic guidepath 4Du and the stator magnetic guidepath 4Dd without being attached thereto, and a magnetic path is formed via these contact surfaces. By using this constitution, even when compressive stress is applied to the magnetostrictive material 6D by the compressive displacement of the piezoelectric material 5D, this compressive stress does not affect the stator magnetic flux generator 3D, thereby making it possible to prevent the compressive stress from affecting the magnet.

Further, compressive stress can also be prevented from affecting the soft magnetic material of the stator side, which makes up the stator magnetic guidepath.

Furthermore, FIG. 26 shows an example in which magnetic flux controlling means 4Dns is attached by a attachment part 15 located in the axial center of the stator magnetic flux generator 3D, but the attachment location does not have to be located in the axial center. Further, instead of attaching magnetic flux controlling means 4Dns to the stator magnetic flux generator 3D, it can also be attached to either one of the stator magnetic guidepath 4Du or the stator magnetic guidepath 4Dd.

Figure 26A:
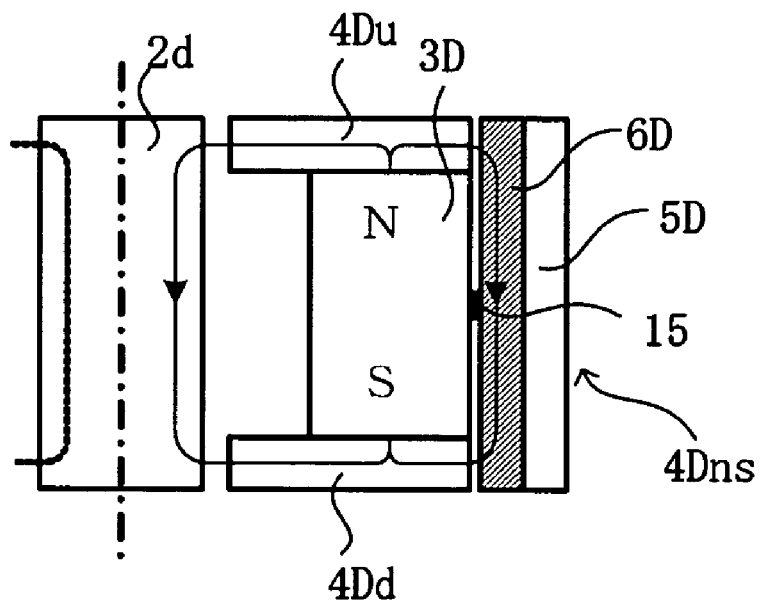
FIG. 26 is diagrams for illustrating examples of constitutions, which form a magnetic path in-plane in the axial direction in a second mode of the present invention (Sixth Embodiment)
Figure 26B:
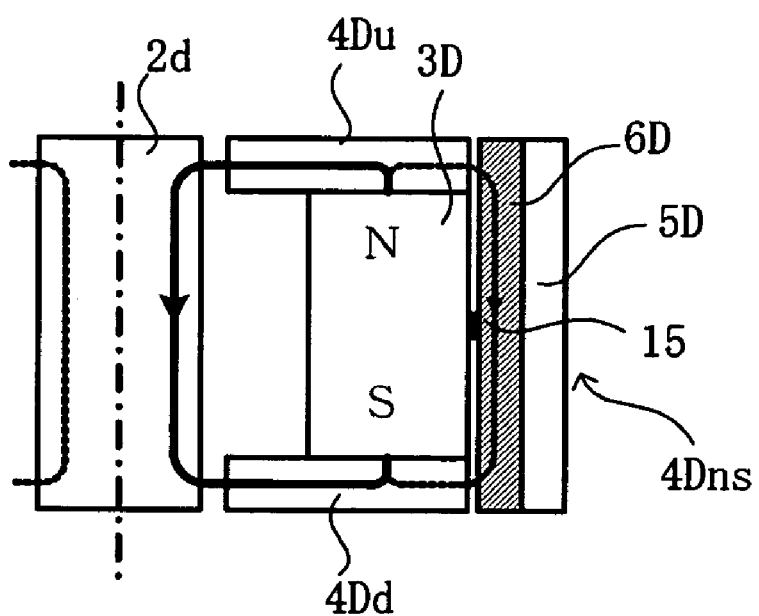

FIG. 26A shows a state in which magnetic flux controlling means 4Dns does not actuate. In this state, magnetic flux from the stator magnetic flux generator 3D is allocated in accordance with the respective magnetic resistance of the magnetic path that passes through magnetic flux controlling means 4Dns, and the magnetic path that passes through the stator magnetic guidepaths 4Du, 4Dd and the rotor 2d. Conversely, FIG. 26B shows a state in which magnetic flux controlling means 4Dns is actuated. In this state, the amount of magnetic flux flowing to the magnetic path that passes through magnetic flux controlling means 4Dns is reduced due to the increased magnetic resistance, and the amount of magnetic flux flowing through the magnetic path that passes through the stator magnetic guidepaths 4Du, 4Du and rotor 2d increases as a result of this reduction.

FIG. 27 is a diagram for illustrating the rotational operation of the rotor 2d in accordance with the second mode. An example in which three magnetic poles (#1 through #3) are arranged around the periphery of the rotor 2d is shown. The respective magnetic poles comprise the constitution shown in FIG. 26.

When none of the magnetic flux controlling means 4Dns comprising the respective magnetic poles are actuated, the magnetic flux around the periphery of the rotor 2d constitutes a balanced state, and rotational force does not act on the rotor 2d. By contrast, when any of the magnetic flux controlling means 4Dns comprising the respective magnetic poles are actuated, the amount of magnetic flux of the magnetic flux, which flows to the magnetic pole of the stator magnetic guidepath on which this magnetic flux controlling means 4Dns is provided, increases, the magnetic flux around the periphery of the rotor 2d transitions to an unbalanced state, and rotational force acts on the rotor 2d.

Figure 27A:
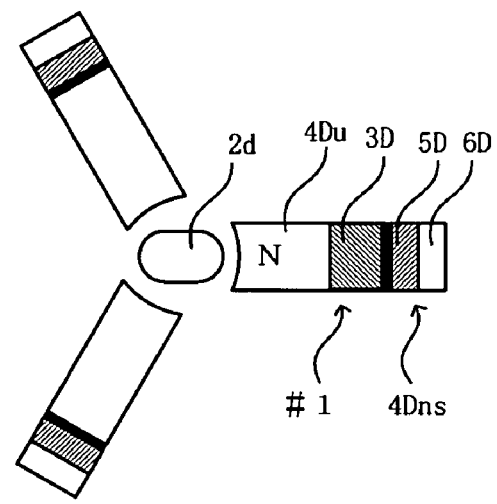
FIG. 27 is diagrams for illustrating the rotational operation of the rotor in a second mode of the present invention (Sixth Embodiment)
Figure 27B:
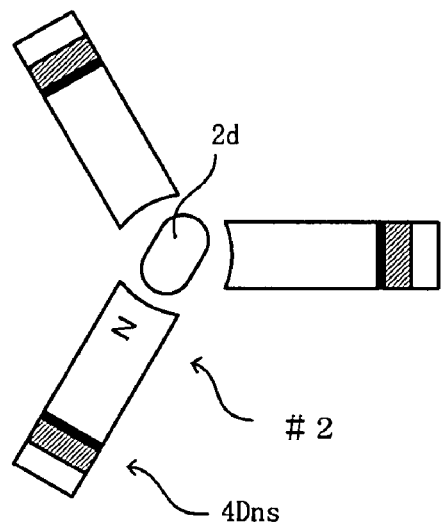
Figure 27C:
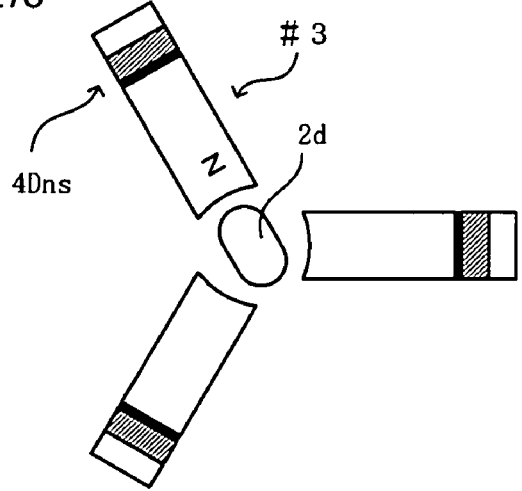

FIG. 27A shows a state in which the #1 magnetic flux controlling means 4Dns is actuated. Consequently, the rotor 2d rotates by moving toward the #1 magnetic pole. FIG. 27B shows a state in which the #2 magnetic flux controlling means 4Dns is actuated. Consequently, the rotor 2d rotates by moving toward the #2 magnetic pole. Further, FIG. 27C shows a state in which the #3 magnetic flux controlling means 4Dns actuated. Consequently, the rotor 2d rotates by moving toward the #3 magnetic pole.

Figure 28A:
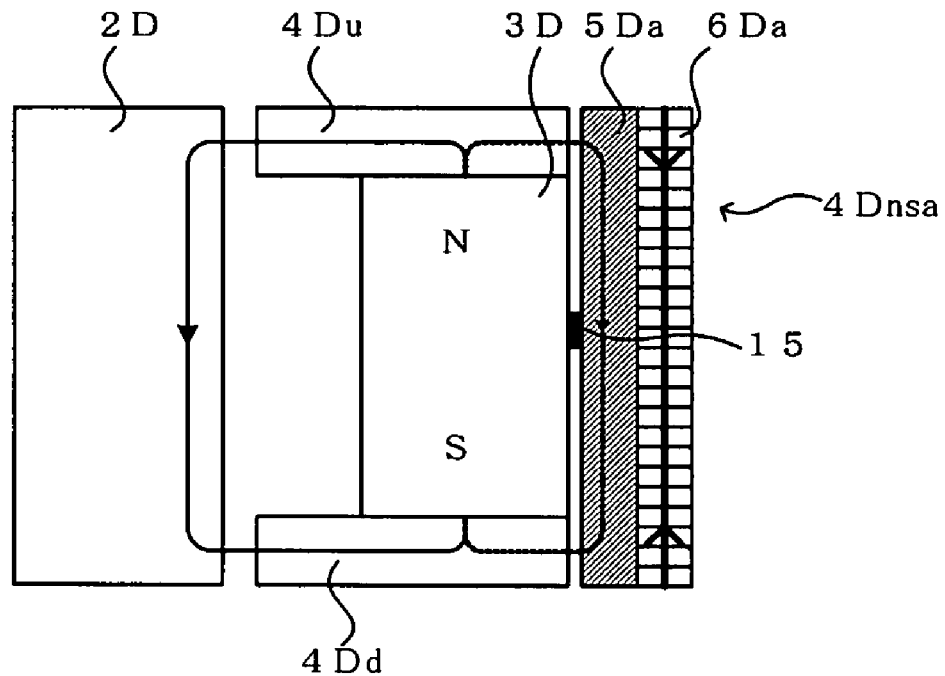
FIG. 28 is diagrams for illustrating other examples of constitutions of magnetic flux controlling means in a second mode of the present invention (Sixth Embodiment)
Figure 28B:
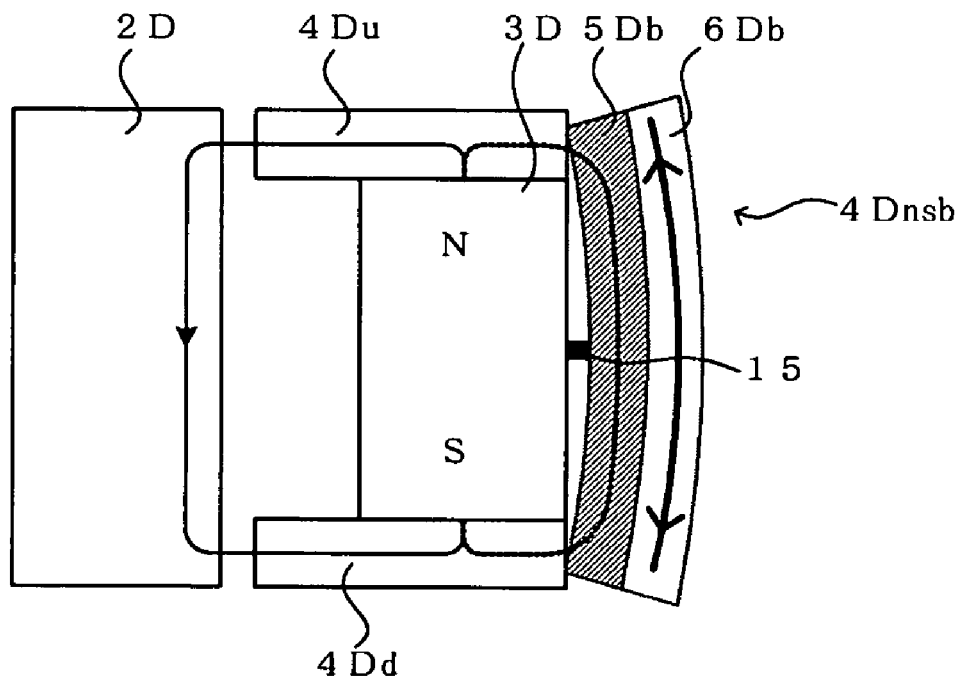

FIG. 28 is a diagram for illustrating an example of another constitution of magnetic flux controlling means 4Dns. The example of the constitution shown in FIG. 28A is an example in which the piezoelectric material 6Da comprising magnetic flux controlling means 4Dns is constituted as a stacked element, and the example of the constitution shown in FIG. 28B is an example in which the piezoelectric material 6Db comprising magnetic flux controlling means 4Dns is constituted as a monomorph piezoelectric element.

According to the constitution of FIG. 28A, constituting the piezoelectric material 6Da as a stacked element axially reduces the magnetostrictive material 5Da. Conversely, according to the constitution of FIG. 28B, constituting the piezoelectric material 6Db as a monomorph piezoelectric element shrinks the magnetostrictive material 5Db by causing it to bend. In the case of the constitution of FIG. 28B, when magnetic flux controlling means 4Dns bends, the space between the stator magnetic flux generator 3D and the magnetostrictive material 5Db increases, raising the fear that the attachment between the magnetostrictive material 5Db and the stator magnetic flux generator 3D could come off. Accordingly, the attachment member 15, which attaches the magnetostrictive material 5Db to the stator magnetic flux generator 3D is made from an elastic body, and is constituted such that the magnetostrictive material 5Db does not come off the stator magnetic flux generator 3D when bent.

Seventh Embodiment

Next, an example of a four-pole constitution of the second mode in which a magnetic path is formed on a radial inner surface will be explained using FIGS. 29 and 30.

Figure 29:
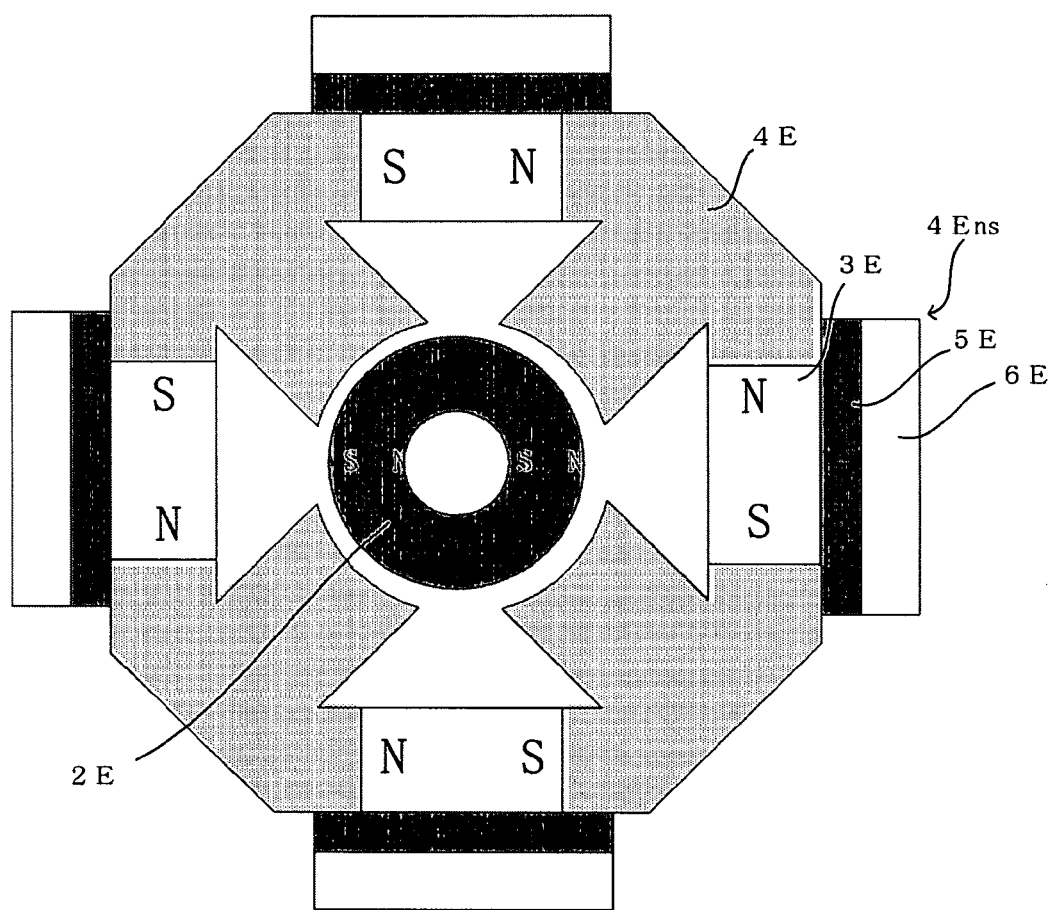
FIG. 29 is a diagram for illustrating an example of a four pole constitution, which forms a magnetic path in-plane in the radial direction in a second mode of the present invention (Seventh Embodiment)

The constitution shown in FIG. 29 constitutes a stator, which has four stator magnetic flux generators 3E, the same poles of which face one another, the respective magnetic poles are linked by four stator magnetic guidepaths 4E, and a magnetic pole, which causes one part of this stator magnetic guidepath 4E to protrude toward a rotor 2E, and the rotor 2E is arranged in the center of the four magnetic poles of this stator. Magnetic flux controlling means 4Ens is provided in the stator as a bridge between the two stator magnetic guidepaths 4E that sandwich a magnetic flux generator 3E. Further, the rotor 2E uses two poles.

A magnetic path that passes through this magnetic flux controlling means 4Ens, and a magnetic path that passes through a stator magnetic guidepath 4E and the rotor 2E are parallelly connected relative to the stator magnetic flux generator 3E. The one magnetic flux, of the magnetic flux that is generated from the N pole of the stator magnetic flux generator 3E, follows a magnetic path, which passes through the stator magnetic guidepath 4E, the rotor 2E, and the stator magnetic guidepath 4E and returns to the S pole of the stator magnetic flux generator 3E, and the other magnetic flux follows a magnetic path, which passes through the magnetic flux controlling means 4Ens, and returns to the S pole of the stator magnetic flux generator 3E. The amount of magnetic flux of the magnetic flux, which passes through these two magnetic paths, is allocated based on the magnetic resistance of the respective magnetic paths.

Here, magnetic flux controlling means 4Ens is constituted by stacking and bonding a piezoelectric material 5E and a magnetostrictive material 6E the same as in the respective examples of constitutions of the above-described mode. The piezoelectric material 5E is made from a material that can be displaced by applying an electric field, and compressively displacing this piezoelectric material 5E applies compressive stress to the adjoining magnetostrictive material 6E. Upon being subjected to compressive stress, the magnetic permeability of the magnetostrictive material 6E changes by virtue of the reverse magnetostrictive effect.

FIG. 30 shows an example of operation. FIG. 30A shows an axial cross-section, and FIGS. 30B through 30E show cross-sections in a direction that is perpendicular to the axial direction.

In FIG. 30B, magnetic flux controlling means 4Ens located on the left of the figure is driven, compressive stress is applied to the magnetostrictive material 6E and the amount of magnetic flux that passes through the magnetostrictive material 6E decreases, consequently increasing the amount of magnetic flux that flows to the rotor 2E from the magnetic pole tip on the left side of the figure. Magnetic flux controlling means 4Ens located on the right of the figure is not driven at this time.

Consequently, the amount of magnetic flux flowing to the rotor 2E from the magnetic pole tip on the right side of the figure does not change.

Accordingly, the amount of magnetic flux flowing to the left side becomes greater than the amount of magnetic flux flowing to the right side relative to the rotor 2E. In accordance with this imbalance in the amount of magnetic flux, the rotor 2E rotates in the counterclockwise direction as shown in FIGS. 30B and 30C.

Subsequent to rotation, the driving of magnetic flux controlling means 4Ens located on the left of the figure stops, and when the amount of magnetic flux flowing to the rotor 2E from the magnetic pole tip on the left side of the figure achieves equilibrium with the amount of magnetic flux flowing to the rotor 2E from the magnetic pole tip of the right side, the rotational position of the rotor is maintained (FIG. 30D). Furthermore, when the rotor is to be rotated, magnetic flux controlling means 4Ens located at the top of the figure is driven, increasing the amount of magnetic flux flowing to the rotor 2E from the magnetic pole tip at the top side of the figure. Magnetic flux controlling means 4Ens located at the bottom of the figure is not driven at this time, and the amount of magnetic flux flowing to the rotor 2E from the magnetic pole tip does not change.

Accordingly, the amount of magnetic flux flowing to the top side becomes greater than the amount of magnetic flux flowing to the bottom side relative to the rotor 2E, and in accordance with this imbalance in the amount of magnetic flux, the rotor 2E rotates in the counterclockwise direction as shown in FIGS. 30D and 30E.

Eighth Embodiment

Next, an example of a multi-pole (six poles here) constitution of the second mode in which a magnetic path is formed on a radial inner surface will be explained using FIGS. 31 and 32.

Figure 31:
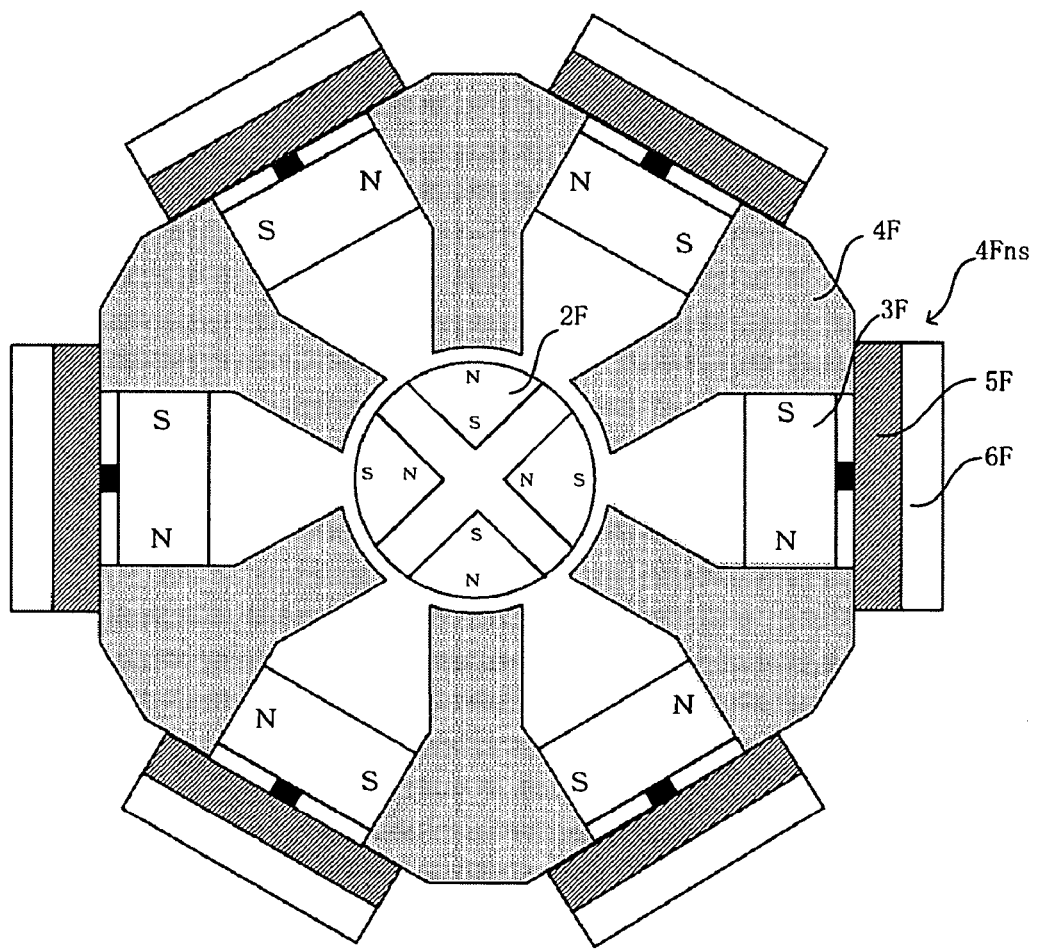
FIG. 31 is a diagram for illustrating an example of a multi-pole constitution, which forms a magnetic path in-plane in the radial direction in a second mode of the present invention (Eighth Embodiment)

The constitution shown in FIG. 31 constitutes a stator, which has six stator magnetic flux generators 3F, the same poles of which face one another, the respective magnetic poles are linked by six stator magnetic guidepaths 4F, and a magnetic pole, which causes one part of this stator magnetic guidepath 4F to protrude toward a rotor 2F, and the rotor 2F is arranged in the center of the six magnetic poles of this stator. Furthermore, this figure shows a case in which the rotor 2F has four poles.

Further, magnetic flux controlling means 4Fns is provided in the stator as a bridge between the two stator magnetic guidepaths 4F that sandwich a magnetic flux generator 3F.

A magnetic path that passes through this magnetic flux controlling means 4Fns, and a magnetic path that passes through a stator magnetic guidepath 4F and the rotor 2F are parallelly connected relative to the stator magnetic flux generator 3F. The one magnetic flux, of the magnetic flux that is generated from the N pole of the stator magnetic flux generator 3F, follows a magnetic path, which passes through the stator magnetic guidepath 4F, the rotor 2F, and the stator magnetic guidepath 4F and returns to the S pole of the stator magnetic flux generator 3F, and the other magnetic flux follows a magnetic path, which passes through the magnetic flux controlling means 4Fns, and returns to the S pole of the stator magnetic flux generator 3F. The amount of magnetic flux of the magnetic flux, which passes through these two magnetic paths, is allocated based on the magnetic resistance of the respective magnetic paths.

Here, magnetic flux controlling means 4Fns is constituted by stacking and bonding a piezoelectric material 5F and a magnetostrictive material 6F the same as in the respective examples of constitutions of the above-described mode. The piezoelectric material 5F is made from a material that can be displaced by applying an electric field, and compressively displacing this piezoelectric material 5F applies compressive stress to the adjoining magnetostrictive material 6F. Upon being subjected to compressive stress, the magnetic permeability of the magnetostrictive material 6F changes by virtue of the reverse magnetostrictive effect.

FIG. 32 shows an example of operation. FIGS. 32A through 32F show cross-sections in a direction that is perpendicular to the axial direction. Furthermore, in FIG. 32, the locations of the six magnetic flux controlling means and magnetic poles are respectively expressed as "A" through "F".

FIG. 32A is a state in which the respective magnetic flux controlling means 4Fns are not actuated. In this operational state, the magnetic flux surrounding the rotor 2F is in balance. The rotor 2F is maintained in a stable position by this balanced magnetic flux. In the figure, two magnetic poles, which face each other across the fixed axis of the rotor 2F, maintain the rotor 2F in a position, which opposes magnetic pole locations "C" and "F", which are arranged facing one another 180 degrees apart.

FIG. 32B shows a state in which magnetic flux controlling means 4Fns of the magnetic pole location "A" is actuated. Since the amount of magnetic flux of magnetic pole location "A" increases in this state, the rotor 2F rotates in the direction in which it will be stabilized by the magnetic flux being formed at magnetic pole location "A" (counterclockwise in the figure). Subsequent to the rotor 2F rotating to magnetic pole location "A", the operation of magnetic flux controlling means 4Fns causes the magnetic flux surrounding the rotor 2F to once again transition to a balanced state. The rotor 2F is maintained in a stable position by this balanced magnetic flux (FIG. 32C).

Thereafter, similarly switching magnetic flux controlling means 4Fns, which are driven in order, makes it possible to rotate the rotor 2F, and when the driving of magnetic flux controlling means 4Fns is stopped, the rotor 2F is maintained in a position in which it is stabilized by the balanced magnetic flux at the time.

Further, reversing the order in which magnetic flux controlling means 4Fns are driven makes it possible to switch the direction of rotation.

What is claimed is:

1. A magnetic drive apparatus, which comprises a rotor having a rotor magnetic flux generator; and a stator having a stator magnetic flux generator, and a stator magnetic guidepath for guiding magnetic flux from the stator magnetic flux generator to said rotor, and which rotationally drives said rotor relative to said stator by controlling the flow of the magnetic flux of said stator magnetic flux generator,
   said magnetic drive apparatus further comprising:
   magnetic flux controlling means, which bridges a first gap between the end tip of said stator magnetic guidepath on said rotor side, and a magnetic pole tip arranged at a prescribed angular location on the periphery of said rotor, by having respective stacking parts on the end tip and magnetic pole tip,
   wherein said magnetic flux controlling means has a function for magnetically reconnecting to said magnetic pole tip after controlling the flow of magnetic flux, which is blocked by said first gap.

2. The magnetic drive apparatus according to claim 1, wherein said stator magnetic guidepath is constituted from a first stator magnetic guidepath for guiding the one magnetic flux of said stator magnetic flux generator to said rotor, and a second stator magnetic guidepath for guiding the other magnetic flux of said stator magnetic flux generator to said rotor, and
   said stator magnetic flux generator is provided as a bridge across a second gap, which is provided between said first and second stator magnetic guidepaths.

3. The magnetic drive apparatus according to claim 2, wherein said first stator magnetic guidepath is constituted so as to divide the one magnetic flux of said stator magnetic flux generator into a plurality in mid-flow, and to guide said the one magnetic flux to said rotor via said respective magnetic pole tips of a single magnetic pole, and
   said second stator magnetic guidepath is constituted so as to divide the other magnetic flux of said stator magnetic flux generator into a plurality in mid-flow, and to guide said the other magnetic flux to said rotor via said respective magnetic pole tips of a single magnetic pole.

4. The magnetic drive apparatus according to claim 2 or 3, wherein a non-magnetic material is provided in said second gap.

5. The magnetic drive apparatus according to claim 2 or 3, wherein said second gap is constituted such that the magnetic flux guided to said first and second stator magnetic guidepaths saturates.

6. The magnetic drive apparatus according to claim 1, wherein said magnetic flux controlling means rotationally drives said rotor relative to said stator by controlling the flow of magnetic flux to said magnetic pole tips and switching the strong/weak balance of the respective positive and negative poles manifested in said magnetic pole tips, by controlling the magnetic characteristics of said stator magnetic guidepaths.

7. The magnetic drive apparatus according to claim 1, wherein said magnetic flux controlling means comprises a magnetostrictive material, the magnetic characteristics of which can be changed by applying stress, and a piezoelectric material, which adjoins and applies stress to the magnetostrictive material.

8. The magnetic drive apparatus according to claim 1, wherein a non-magnetic material is provided in said first gap.

9. The magnetic drive apparatus according to claim 1, wherein said first gap is constituted such that the magnetic flux guided to said end tip of said stator magnetic guidepath saturates.

* * * * *